US 011492964B2

(12) United States Patent
Keller

(10) Patent No.: US 11,492,964 B2
(45) Date of Patent: Nov. 8, 2022

(54) INTEGRATED SUPERCRITICAL CO₂/MULTIPLE THERMAL CYCLES

(71) Applicant: Michael F. Keller, Overland Park, KS (US)

(72) Inventor: Michael F. Keller, Overland Park, KS (US)

( * ) Notice: Subject to any disclaimer, the term of this patent is extended or adjusted under 35 U.S.C. 154(b) by 0 days.

(21) Appl. No.: 17/488,173

(22) Filed: Sep. 28, 2021

(65) Prior Publication Data

US 2022/0162987 A1    May 26, 2022

Related U.S. Application Data

(60) Provisional application No. 63/118,129, filed on Nov. 25, 2020.

(51) Int. Cl.
  *F02C 1/10*  (2006.01)

(52) U.S. Cl.
  CPC ............ *F02C 1/10* (2013.01); *F05D 2220/31* (2013.01); *F05D 2220/72* (2013.01); *F05D 2220/76* (2013.01); *F05D 2260/213* (2013.01)

(58) Field of Classification Search
  CPC .... F02C 1/10; F05D 2220/31; F05D 2220/72; F05D 2220/76; F05D 2260/213
  See application file for complete search history.

(56) References Cited

U.S. PATENT DOCUMENTS

| | | |
|---|---|---|
| 2,186,706 A | 1/1940 | Martinka |
| 2,482,791 A | 9/1949 | Nettel |
| 2,567,581 A | 9/1951 | Salter |
| 2,584,232 A | 2/1952 | Sedille |
| 2,625,012 A | 1/1953 | Larrecq |
| 2,626,502 A | 1/1953 | Lagelbauer |
| 2,633,707 A | 4/1953 | Hermitte et al. |
| 2,655,364 A | 10/1953 | Maldague |
| 2,758,827 A | 8/1956 | Pfenninger |
| 3,048,018 A | 8/1962 | Nicolin |
| 3,325,992 A | 6/1967 | Sheldon |
| 3,410,091 A | 11/1968 | Frutschi |
| 3,583,156 A | 6/1971 | Schabert |
| 3,715,887 A | 2/1973 | Weatherly et al. |
| 3,748,228 A | 7/1973 | Zimmerman |
| 3,788,944 A | 1/1974 | Stracke |
| 3,951,737 A | 4/1976 | Frutschi et al. |
| 3,962,864 A | 6/1976 | Williams et al. |
| 4,021,299 A | 5/1977 | Rigollot |
| 4,193,266 A | 3/1980 | Frutschi |
| 4,229,257 A | 10/1980 | Forster |
| 4,353,214 A | 10/1982 | Gardner |

(Continued)

OTHER PUBLICATIONS

Keller, "Hybrid Nuclear Energy Systems—A Sustainable Solution for the 21st Century", Academic Press, 2021.

*Primary Examiner* — Shafiq Mian
(74) *Attorney, Agent, or Firm* — Avek IP, LLC

(57) ABSTRACT

This disclosure relates to the unique integration of a plurality of thermodynamic cycles comprised of a supercritical carbon dioxide thermodynamic cycle, one or more other thermodynamic cycles with multiple heat sources derived from nuclear fuel, solar energy, hydrogen, and fossil fuels, with the energy production systems configured to noticeably improve power plant efficiency, cost and performance.

33 Claims, 8 Drawing Sheets

(56) References Cited

U.S. PATENT DOCUMENTS

| | | | |
|---|---|---|---|
| 4,368,616 A | 1/1983 | Abo et al. | |
| 4,498,289 A | 2/1985 | Osgerby | |
| 4,537,023 A | 8/1985 | Nakamura et al. | |
| 4,686,832 A * | 8/1987 | Miliaras | F01K 21/00 60/676 |
| 4,745,868 A | 5/1988 | Seabury | |
| 4,756,873 A | 7/1988 | Schoening | |
| 4,765,142 A | 8/1988 | Nakhamkin | |
| 4,829,763 A | 5/1989 | Rao | |
| 4,896,499 A | 1/1990 | Rice | |
| 5,105,617 A | 4/1992 | Malohn | |
| 5,121,607 A | 6/1992 | George, Jr. | |
| 5,309,492 A | 5/1994 | Adams | |
| 5,347,806 A | 9/1994 | Nakhamkin | |
| 5,361,377 A | 11/1994 | Miller | |
| 5,704,209 A | 1/1998 | Bronicki et al. | |
| 5,822,974 A | 10/1998 | McGowin et al. | |
| 5,924,283 A | 7/1999 | Burke, Jr. | |
| 6,038,849 A | 3/2000 | Nakhamkin et al. | |
| 6,305,158 B1 | 10/2001 | Nakhamkin et al. | |
| 6,644,013 B1 | 11/2003 | Hatamiya et al. | |
| 6,674,830 B2 | 1/2004 | Kato et al. | |
| 6,745,569 B2 | 6/2004 | Gerdes | |
| 7,131,259 B2 | 11/2006 | Rollins, III | |
| 7,685,820 B2 | 3/2010 | Litwin et al. | |
| 7,961,835 B2 | 6/2011 | Keller | |
| 8,490,397 B2 | 7/2013 | Lehar | |
| 8,522,552 B2 | 9/2013 | Waterstripe et al. | |
| 8,537,961 B2 | 9/2013 | Keller | |
| 8,596,075 B2 | 12/2013 | Allam et al. | |
| 8,616,001 B2 | 12/2013 | Held et al. | |
| 8,783,034 B2 | 7/2014 | Held | |
| 8,887,503 B2 | 11/2014 | Sonwane et al. | |
| 9,500,185 B2 | 11/2016 | Al-Sulalman | |
| 2004/0060277 A1 * | 4/2004 | Hatamiya | F01D 25/32 60/39.53 |
| 2007/0280400 A1 * | 12/2007 | Keller | F01K 23/16 376/317 |

\* cited by examiner

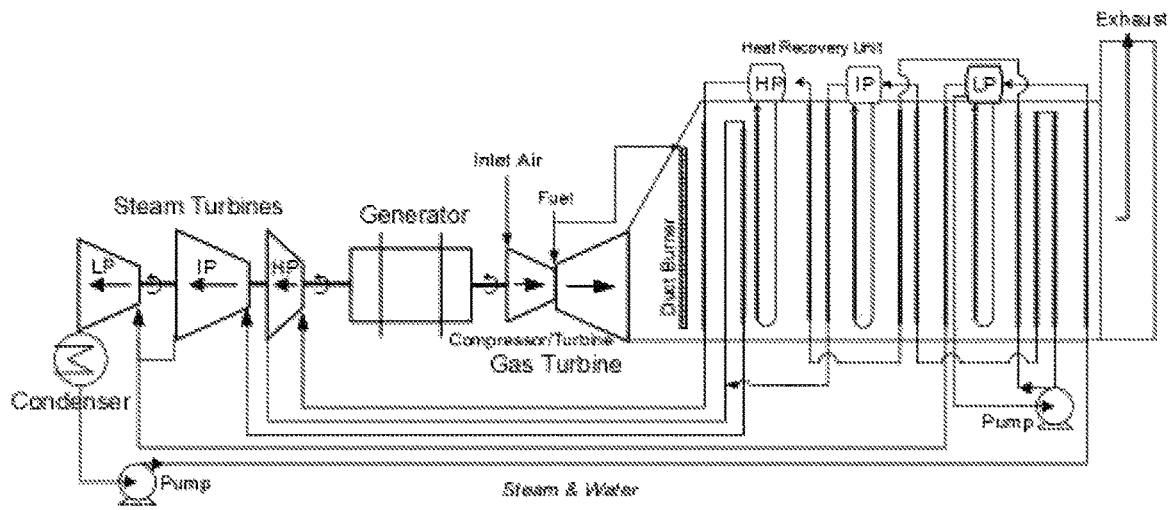
FIG. 1 - PRIOR ART
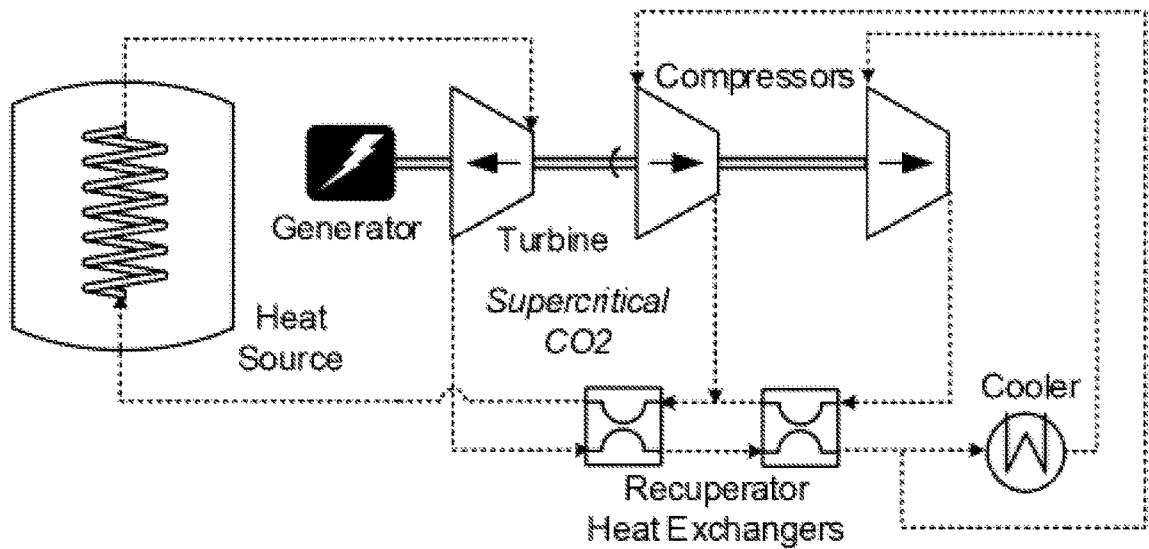
FIG. 2 - PRIOR ART

INTEGRATED SUPERCRITICAL
CO₂/MULTIPLE THERMAL CYCLES

CROSS REFERENCE TO RELATED APPLICATION

This application claims the benefit of co-pending application Ser. No. 63/118,129, filed Nov. 25, 2020, entitled ADVANCED MULTI-CYCLE INTEGRATED HYBRID ENERGY PRODUCTION.

FIELD

The present invention relates to using energy discharged from a heat source into a Heat Recovery Unit (HRU) wherein exhaust energy is used and shared by several fluids, at least one of which is a supercritical fluid.

BACKGROUND

The Second Law of Thermodynamic states that thermal efficiency depends on the temperature difference between a heat source and a heat sink. Various thermodynamic cycles have been developed to efficiently convert energy into useful work.

The Rankine closed-system steam cycle has been is use for well over a century. The cycle involves pressurizing water using a plurality of pumps, with heat from an energy source and a plurality of heat exchangers used to increase the temperature of the water, with the heat exchangers typically located within a Heat Recovery Unit (HRU) or boiler. A plurality HRU evaporator heat exchangers boil the water to create steam that is further heated by a plurality of HRU heat exchangers that superheat the steam subsequently directed to a turbine/generator, with the turbine discharging low-pressure steam into a cooler that condenses the water for reuse. The boiling of water requires a considerable amount of energy to evaporate the liquid, thereby causing constraints on the efficient use of energy source's heat. More specifically, the energy required to vaporize (boil) a liquid exceeds that necessary to heat the liquid just short of the commencement vaporization. However, for very hot energy sources, the HRU energy available after vaporization can significantly exceed that necessary to heat the liquid. That is why multiple pressure reheat steam turbines are generally necessary to efficiently use very hot energy sources.

The open-system Brayton combustion turbine cycle has been in use since the 1940s. Air is pressurized by a compressor, fuel added and ignited, with the hot gas used to rotate a turbine that drives the compressor. The turbine can also produce electrical energy by rotating a generator in addition to the compressor.

In the early 1960s, the open-system combustion turbine Brayton air cycle was combined with an HRU that uses the combustion turbine's hot exhaust gas to create steam associated with the Rankine closed-system cycle. FIG. 1 illustrates a typical triple-pressure, multiple-reheat steam turbine configuration. Such combined-cycle power plants have become more powerful and efficient as combustion turbine firing temperatures and pressures have steadily increased. However, the ever-higher combustion turbine firing temperatures also increase the temperature of the turbine's exhaust gas entering the HRU. In order to efficiently use the exhaust gas, a plurality of multiple-pressure steam turbines employing reheating of the turbine's discharged steam are necessary. Additionally, the HRU's heat energy can be augmented by fuel fired burners used to further increase exhaust gas temperatures to support additional steam production to meet power grid peaks. The higher HRU temperatures and plurality of reheat steam turbines face material issues, plant control issues, and higher plant capital costs as well as plant reliability problems. The higher firing temperatures of modern combustion turbines are challenging the ability of steam turbines to economically and technically accommodate the increasing steam temperatures caused by higher gas turbine firing temperatures.

Supercritical $CO_2$ thermodynamic cycles have been in development for over 50 years. The physical characteristics of supercritical $CO_2$ hold the promise of significantly reduced equipment sizes and power plant costs because, unlike cycles employing fluids such as water, boiling of $CO_2$ is not a required; the supercritical $CO_2$ behaves as neither a distinct vapor nor liquid. Additionally, cooling methods can be employed similar to those used with combustion turbines employing very hot turbine inlet temperatures. FIG. 2 illustrates a typical closed-system Brayton supercritical $CO_2$ cycle. A Heat Recovery Unit (HRU) employs a heat exchanger to extract heat from the energy source, thereby allowing hot, high pressure supercritical $CO_2$ to be used by a turbine/generator. The intermediate pressure exhaust from the turbine is used by a plurality of recuperator heat exchangers to preheat re-pressurized supercritical $CO_2$ directed to the HRU; re-pressurization is accomplished by pumps and/or compressors. The recuperators face formidable issues (e.g., effectiveness, high temperature materials and associated costs) owing to the somewhat similar properties of the opposing recuperator supercritical $CO_2$ and the need for large scale recuperator energy transfers. In order to efficiently and effectively transfer energy, the recuperators become impractically large. Additionally, pressurization of the supercritical $CO_2$ faces formidable equipment design, efficiency and operational problems. Successful commercial deployment of the supercritical $CO_2$ cycle power plants remains elusive.

Small nuclear reactors are being developed as a potential means to further nuclear energy. Generally, such reactors rely on utilization of a Rankine closed-system cycle. However, the historical record favors energy production plants that are more efficient and larger than earlier designs, casting doubt on the competitiveness of small reactors that do not possess some forms of economic, technical, and efficiency advantages.

SUMMARY

The disclosure relates to power/energy plants and includes a plurality of heat sources, a plurality of heat recovery units, a plurality of heat exchangers as well as a plurality of recuperators, a plurality of heat exchanger coolers and a plurality of turbines and compressors. The elements of the disclosure are uniquely comprised to allow a plurality of thermal cycles and a Brayton Supercritical $CO_2$ cycle to optimally operate while collectively overcoming earlier limitations. The innovation produces more efficient and economic power plants. The energy of the thermodynamic cycles is not limited to particular heat source. Heat sources, including nuclear energy, fossil fuels, hydrogen and solar energy can be used. Combustion turbines using different fuel sources such as gasified coal, natural gas, or hydrogen can be employed. Also, supplemental energy additions to the heat sources can include natural gas, hydrogen and gasified coal, for example. Embodiments of the innovation include nuclear reactors employing a variety of working fluids, including liquids; gases; and fluids containing fissile nuclear materials.

The disclosure's integration of thermal cycles supports power plant efficiency and power output improvements as well as plant simplifications.

BRIEF DESCRIPTION OF THE DRAWINGS

FIG. 1 illustrates a typical combined-cycle power plant employing an open-system Brayton gas turbine thermal cycle and a closed system Rankine steam thermal cycle.

FIG. 2 illustrates a typical power plant employing a closed-system Brayton supercritical thermal cycle.

DETAILED DESCRIPTION

Figure 3:
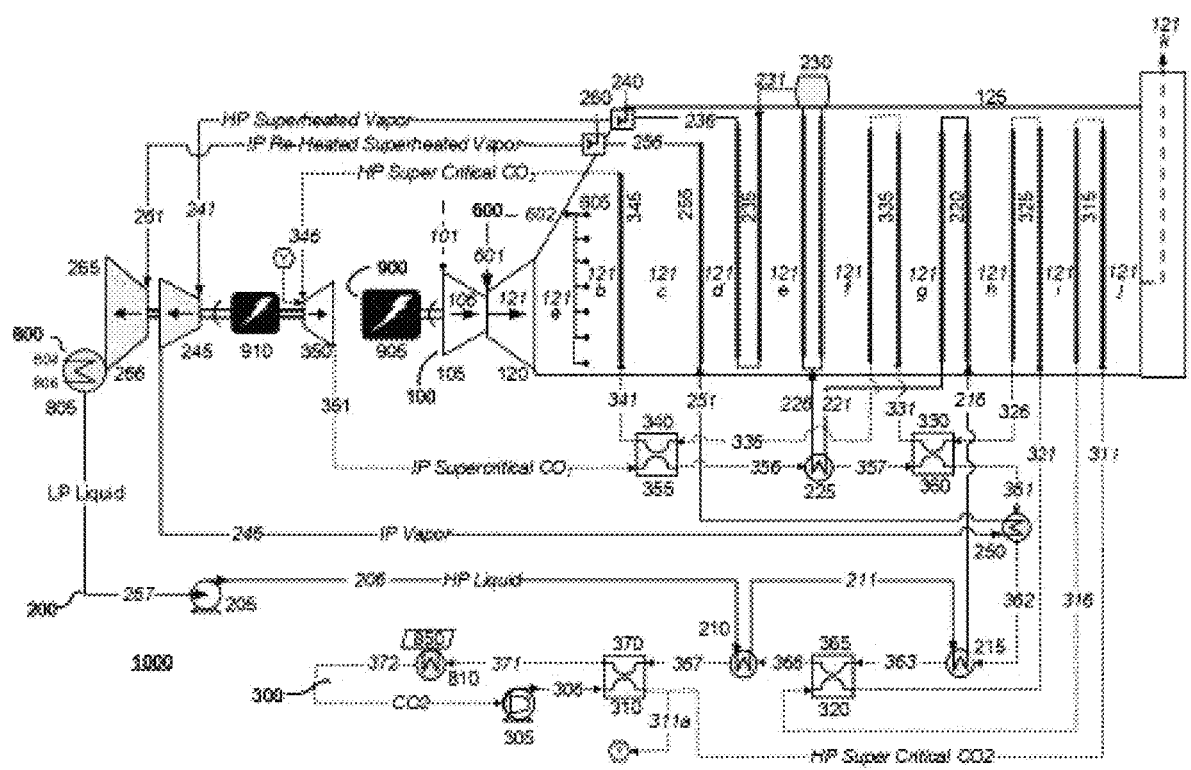
FIG. 3 illustrates a power plant employing a Brayton closed-system supercritical $CO_2$ cycle, a Brayton open-system air cycle, and a Rankine closed-system cycle.

FIG. 3 illustrates a preferred embodiment of the invention in power plant 1000. Referring to FIG. 3, the Rankine closed-system cycle 200, Brayton closed-system supercritical $CO_2$ cycle 300 and Brayton open-system air cycle 100 are uniquely integrated. Energy transfer by a plurality of multi-media heat exchangers and recuperator heat exchangers is more efficiently and practically accomplished by sequentially interweaving multi-cycle energy transfers from a plurality of heat sources, including the exhausts associated from the plurality of Brayton open-system air cycle 100 and Brayton closed-system supercritical $CO_2$ cycle 300 turbines. A plurality of the heat exchanger types allows practical deployment of the Brayton closed-system supercritical $CO_2$ cycle 300 by avoiding the heat transfer complications of earlier approaches. Additionally, pressurization of the $CO_2$ is more practically and efficiently accomplished owing to the use of a plurality of electrically motor driven pumps/compressors 305 used to pressurize a largely $CO_2$ fluid to a supercritical state. Relative to earlier approaches employing a plurality of Rankine closed-system cycle 200 and Brayton closed-system supercritical $CO_2$ cycle 300 turbines, the number of turbines is reduced, simplifying the power plant, enhancing economics and improving power plant efficiency.

Broadly, as illustrated by FIG. 3 of power plant 1000, energy transfer between a Rankine closed-system cycle 200, Brayton closed-system supercritical $CO_2$ cycle 300 and Brayton open-system air cycle 100 is accomplished using a plurality of heat exchanger and recuperators. A plurality of heat exchangers located in EMU 125 of the Brayton open-system air cycle 100 sequentially transfer energy from Brayton open-system air cycle 100 to both the Brayton closed-system supercritical $CO_2$ cycle 300 and to Rankine closed-system cycle 200. A plurality of heat exchangers and recuperators are used to sequentially transfer energy from intermediate pressure supercritical $CO_2$ of the Brayton closed-system supercritical $CO_2$ cycle 300 to both the high pressure $CO_2$ of the Brayton closed-system supercritical $CO_2$ cycle 300 and the high pressure liquid and vapor of the Rankine closed-system cycle 200. The Brayton closed-system supercritical $CO_2$ cycle 300 is efficiently optimized to use the heat source 121 energy while the Rankine steam cycle 200 efficiently uses heat source energy 121 to support the practical capabilities of steam turbines 245 and 265 and the Heat Recovery Unit (HRU 125). The ability to simultaneously control the pressure and fluid flow of the Rankine closed-system cycle 200 and control the flow of the Brayton closed-system supercritical $CO_2$ cycle 300 collectively provide net design, operational and efficiency benefits not ordinarily available. These features also provide net operational and control benefits in dealing with the variable flows and temperatures associated with the Brayton open-system air cycle 100.

As shown in FIG. 3 of power plant 1000, the Brayton open-system air cycle 100 employs a compressor 105 that pressurizes ambient inlet air 101 to an intermediate pressure state with fuel 601 then injected and the air/fuel mixture ignited, the pressurized combustion gas 106 thereby causing the rotation of turbine 120 that drives compressor 105 and generator 905 that produces electrical energy. Combustion exhaust gas energy source 121 discharged from combustion turbine 120 constitutes heat source 121a that can be augmented by additional energy created by combusting fuel 602 using HRU 125 duct burner 605, resulting in heat source 121b. HRU 125 contains a plurality of heat exchangers that sequentially transfer Brayton open-system air cycle 100 energy source 121 into the Rankine closed-system cycle 200 and Brayton closed-system supercritical $CO_2$ cycle 300. Conduits or pipes direct hot high pressure superheated vapor of the Rankine closed-system cycle 200 discharged from HRU 125 to HP turbine 245, with Rankine closed-system cycle 200 intermediate pressure vapor discharged from turbine 245 reheated by energy exhausted by the combustion turbine 120 of the Brayton open-system air cycle 100 and by energy discharged from turbine 350 of the Brayton closed-system supercritical $CO_2$ cycle 300. The intermediate pressure reheated fluid of Rankine closed-system cycle 200 is directed from HRU 125 by conduits or pipes to intermediate pressure steam turbine 265, fluid subsequently discharged to a cooling condenser heat exchanger 805 with conduits or pipe then directing the Rankine closed-system cycle 200 liquid to a pump to re-initiate the closed-system Rankine closed-system cycle 200. Relative to the Brayton closed-system supercritical $CO_2$ cycle 300, conduits or pipes direct hot high pressure Brayton closed-system supercritical $CO_2$ cycle 300 from HRU 125 to high pressure supercritical $CO_2$ turbine 350. Conduits or pipes direct intermediate pressure Brayton closed-system supercritical $CO_2$ cycle 300, discharged from supercritical $CO_2$ turbine 350, to a plurality of heat exchangers and recuperators that transfer energy to both the high pressure Brayton closed-system supercritical $CO_2$ cycle 300 and the high pressure fluid of the Rankine closed-system cycle 200. The intermediate pressure supercritical $CO_2$ is ultimately cooled by a plurality of heat exchangers 810 and re-pressurized by a plurality of pumps/compressors 305 to re-initialize the Brayton closed-system supercritical $CO_2$ cycle 300. Turbine 350 of Brayton closed-system supercritical $CO_2$ cycle 300 and turbine 245 of Rankine closed-system cycle 200 rotate a plurality of generator(s) 910 that produces electrical energy.

Referring to power plant 1000 of FIG. 3, the Brayton open-system air cycle 100 is described herein. Ambient inlet air 101 is drawn into compressor 105, fuel 601 added and ignited. The hot, pressurized combustion gas 106 associated with compressor 105 causes turbine 120 to rotate, driving compressor 105 and generator 905. Hot, low-pressure combustion gas energy source 121 exits turbine 120 and enters HRU 125.

Referring to FIG. 3 of power plant 1000, the Brayton closed-system supercritical $CO_2$ cycle 300 is herein described in detail. Intermediate pressure and temperature quasi-supercritical $CO_2$ 372 enters a plurality of electrically motor driven pumps/compressors 305 that pressurize the $CO_2$ to high pressure supercritical 306 then directed by conduits or pipes to recuperator heat exchanger 310/370 where energy is transferred from intermediate pressure supercritical $CO_2$ 367 (ultimately associated with supercritical $CO_2$ 351 discharged by supercritical $CO_2$ turbine 350) to high pressure supercritical $CO_2$ 311. Heated high pressure supercritical $CO_2$ 311 exits recuperator heat exchanger 310/370 and is directed by conduits or pipes to HRU 125 heat exchanger 315 where Brayton open-system air cycle 100 heat source energy 121i transfers energy into Brayton closed-system supercritical $CO_2$ cycle 300 high pressure supercritical $CO_2$ 311 then directed as high pressure supercritical $CO_2$ 316 by conduits or pipes to recuperator heat exchanger 320/365 where energy is transferred from intermediate pressure supercritical $CO_2$ 363 to heat high pressure supercritical $CO_2$ 321 then directed by pipes or conduits to HRU 125 heat exchanger 325. Brayton open-system air cycle 100 heat source 121h transfers energy into exiting supercritical $CO_2$ 326 directed by conduits or pipes to recuperator heat exchanger 330/360 where entering intermediate pressure supercritical 357 further heats exiting high pressure supercritical $CO_2$ 331 then directed by conduits or pipes to HRU 125 heat exchanger 335. Brayton open-system air cycle 100 heat source 121f transfers energy into high pressure supercritical $CO_2$ 336 that exits HRU 125 heat exchanger 335, and then directed by conduits or pipes to recuperator heat exchanger 340/355 where intermediate pressure supercritical $CO_2$ 351 transfers energy into exiting high pressure supercritical $CO_2$ 341 then directed by conduits or pipes to heat exchanger 345 of EMU 125. Brayton open-system air cycle 100 heat source 121b transfers energy into exiting high pressure supercritical $CO_2$ 346 directed by conduits or pipe to high pressure supercritical $CO_2$ turbine 350 that rotates a shaft that drives a plurality of generator(s) 910. Intermediate pressure supercritical $CO_2$ 351 exhausted from turbine 350 is directed by conduits or pipes to recuperator heat exchanger 340/355 that transfers energy from reduced pressure supercritical $CO_2$ 351 to high pressure supercritical $CO_2$ 336. Intermediate pressure supercritical $CO_2$ 356 exiting recuperator heat exchanger 340/355 is then directed by conduits or pipes to Rankine closed-system cycle 200 heat exchanger/evaporator 225 where energy from intermediate pressure supercritical $CO_2$ 356 is transferred to intermediate pressure Rankine closed-system cycle 200 fluid 226. Intermediate pressure supercritical $CO_2$ 357 exiting Rankine closed-system cycle 200 heat exchanger/evaporator 225 is directed by conduits or pipes to supercritical $CO_2$ Brayton cycle recuperator heat exchanger 330/360 where intermediate pressure supercritical $CO_2$ 357 transfers heat to high pressure supercritical $CO_2$ 326. Supercritical $CO_2$ 361 exiting recuperator heat exchanger 330/360 is directed by conduits or pipes to Rankine closed-system cycle 200 heat exchanger 250 where intermediate pressure supercritical $CO_2$ 361 transfers energy to Rankine closed-system cycle 200 intermediate pressure vapor 246 discharged from Rankine closed-system cycle 200 intermediate pressure turbine 245. Brayton closed-system supercritical $CO_2$ cycle 300 intermediate pressure supercritical $CO_2$ 362 discharged from Rankine closed-system cycle 200 heat exchanger 250 is directed by conduits or pipes to Rankine closed-system cycle 200 heat exchanger 215 where Brayton closed-system supercritical $CO_2$ cycle 300 intermediate pressure supercritical 362 transfers energy to Rankine closed-system cycle 200 high pressure fluid 211. Supercritical $CO_2$ 363 exiting Rankine closed-system cycle 200 heat exchanger 215 is directed by conduits or pipes to recuperator heat exchanger 320/365 where intermediate pressure supercritical $CO_2$ 363 transfers energy to high pressure supercritical $CO_2$ 316. Intermediate pressure supercritical $CO_2$ 366 exiting recuperator heat exchanger 320/365 is directed by conduits or pipes to Rankine closed-system cycle 200 heat exchanger 210 where Brayton closed-system supercritical $CO_2$ cycle 300 supercritical $CO_2$ 366 transfers energy to Rankine closed-system cycle 200 high pressure liquid 206. Intermediate pressure supercritical $CO_2$ 367 exiting Rankine closed-system cycle 200 heat exchanger 210 is directed by conduits or pipes to Brayton closed-system supercritical $CO_2$ cycle 300 recuperator heat exchanger 310/370 where energy is transferred to high pressure supercritical $CO_2$ 306 from intermediate pressure supercritical $CO_2$ 367. Intermediate pressure supercritical $CO_2$ 371 exiting recuperator heat exchanger 310/370 is directed by conduits or pipes to heat exchanger cooler 810 where energy is transferred to heat exchanger cooler 810 working fluid from reduced pressure supercritical $CO_2$ 371, thereby causing the reduced pressure supercritical $CO_2$ 372 to revert to a largely $CO_2$ fluid or metastable state $CO_2$ 372 then directed from by conduits or pipes to a plurality of $CO_2$ pumps/compressors 305 for re-pressurization of intermediate pressure $CO_2$ 372 to high pressure supercritical $CO_2$ 306, thus re-initializing the Brayton closed-system supercritical $CO_2$ cycle 300. While electric motors are preferred, for operational simplicity, to drive the plurality of $CO_2$ pumps/compressors 305, a plurality of supercritical $CO_2$ turbines could also be used to drive the plurality of pumps/compressors 305, with the supercritical $CO_2$ turbine exhaust directed by conduits or pipes to the discharge of supercritical $CO_2$ turbine 350. High pressure and cooled supercritical $CO_2$ 311a can be directed by conduits or pipes to cool supercritical turbine 350 stators, rotors and internal parts to accommodate high temperature supercritical $CO_2$ 346 entering the turbine.

Referring to of FIG. 3 of power plant 1000, the closed-system Rankine closed-system cycle 200 is herein described in detail. Reduced pressure liquid 267 enters a plurality of electrically motor driven pumps/compressors 205 that pressurize low-pressure liquid 267 to high pressure liquid 206 directed by conduits or pipes to Rankine closed-system cycle 200 heat exchanger 210 where energy is transferred from Brayton closed-system supercritical $CO_2$ cycle 300 intermediate pressure supercritical $CO_2$ 366 into exiting Rankine closed-system cycle 200 high pressure fluid 211. Heated high pressure fluid 211 is directed by conduits or pipes to Rankine closed-system cycle 200 heat exchanger 215 where intermediate pressure supercritical $CO_2$ 362 transfers energy into exiting high pressure liquid 216 directed by conduits or pipes to Rankine closed-system cycle 200 heat exchanger 220 located in HRU 125 of Brayton open-system air cycle 100. Brayton open-system air cycle 100 heat source 121g transfers energy to Rankine closed-system cycle 200 high pressure liquid 221 exiting HRU 125 heat exchanger 220 with liquid 221 then directed by conduits or pipes to Rankine closed-system cycle 200 heat exchanger/evaporator 225 where Brayton closed-system supercritical $CO_2$ cycle 300 intermediate pressure supercritical $CO_2$ 356 transfers energy into entering high pressure Rankine closed-system cycle 200 liquid 221 that may begin to partially boil. Conduits or pipes transport potentially partially saturated Rankine closed-system cycle 200 fluid 226 exiting heat exchanger/evaporator 225 to HRU 125 heat exchanger/evaporator 230 where the boiling process is completed by energy transferred from HRU 125 heat source 121e of Brayton open-system air cycle 100. Saturated high pressure fluid 231 exiting HRU 125 heat exchanger/evaporator 230 is transported by HRU 125 conduits or piping to HRU 125 heat exchanger 235 where heat source 121d transfers energy into Rankine closed-system cycle 200 fluid 231 that then attains superheated vapor 236 subsequently transported by conduits or pipes to high pressure turbine 245 of Rankine closed-system cycle 200; de-super heater 240 can spray fluid into superheated vapor 236 to prevent excessive fluid temperatures. High pressure superheated vapor 241 enters turbine 245, which rotates a shaft that drives a plurality of generator(s) 910. Intermediate pressure vapor 246 exiting Rankine closed system cycle 200 turbine 245 is directed by conduits or pipes to heat exchanger 250 of Rankine closed-system cycle 200 where intermediate pressure supercritical $CO_2$ 361 exiting Brayton closed-system supercritical $CO_2$ cycle 300 recuperator heat exchanger 330/360 superheats intermediate pressure Rankine closed-system cycle 200 vapor 251. Conduits or pipes direct supercritical vapor 251 from heat exchanger 250 to HRU 125 heat exchanger 255 where Brayton open-system air cycle 100 heat source 121c transfers energy to further superheat Rankine closed-system cycle 200 vapor 251 to a superheated vapor 256 state. Conduits or pipes transport intermediate pressure super-heated vapor 256 exiting HRU 125 heat exchanger 255 to Rankine closed-system cycle 200 steam turbine 265; de-super heater 260 can spray fluid into superheated vapor 256 to prevent excessive fluid temperatures. HRU 125 heat exchangers 235 and 255 are illustrated in a series configuration but could also be arranged in a parallel/series configuration. Intermediate pressure superheated vapor 261 enters a plurality of Rankine closed-system cycle 200 intermediate pressure steam turbine(s) 265, thereby rotating a shaft that drives a plurality of generator(s) 910. Low-pressure fluid 266 discharged from steam turbine 265 is directed into condensing heat exchanger 805 where the cooling fluid 804 is heated by energy transferred from fluid 266 exiting steam turbine 265, thereby causing the Rankine closed-system cycle 200 fluid 266 to revert to liquid 267 state, then directed by conduits or pipes to a plurality of motor driven pumps/compressors 205, thus re-initializing the closed-system Rankine closed-system cycle 200.

Referring to power plant 1000 of FIG. 3, the energy of heat source 121 is practically and efficiently distributed to the Rankine closed-system cycle 200 and Brayton closed-system supercritical $CO_2$ cycle 300. Further, the energy collectively discharged to the environment's ultimate heats sinks (ambient air and potentially a river, lake or ocean) is minimized, thereby improving the efficiency and output of power plant 1000.

Figure 4A:
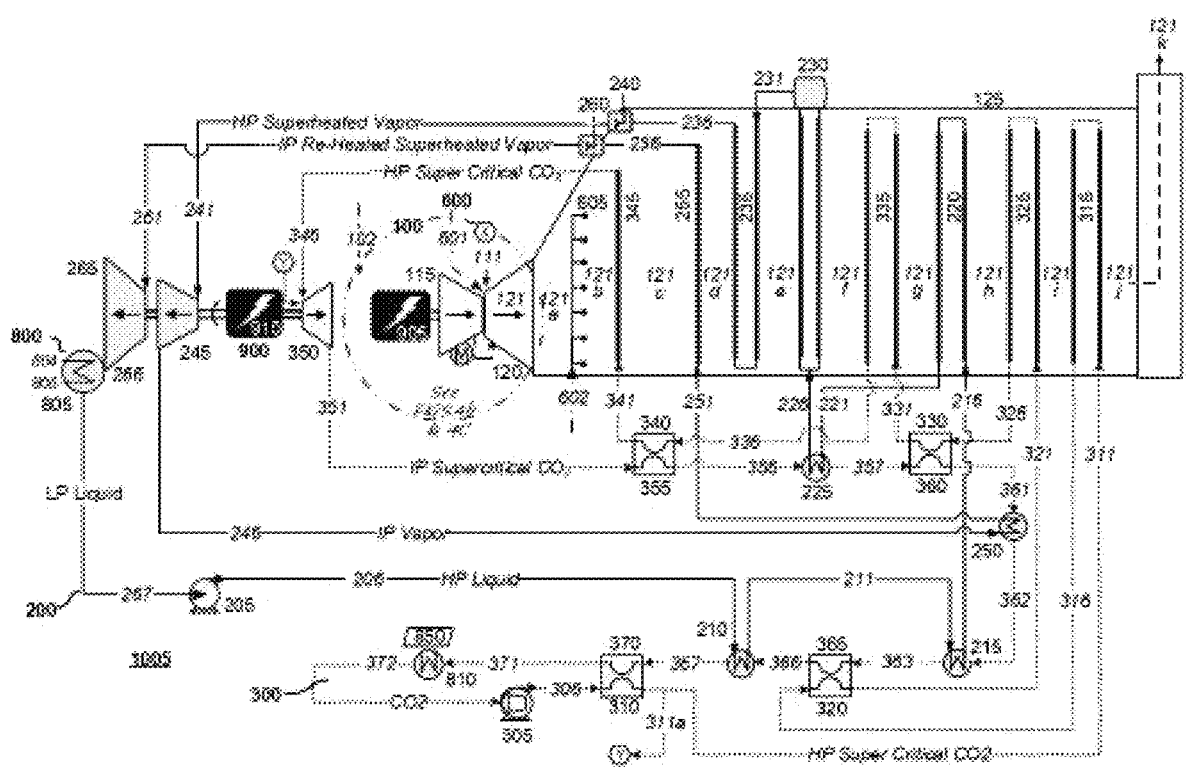
FIG. 4A illustrates a power plant employing a Brayton closed-system nuclear cycle, a Brayton closed-system supercritical $CO_2$ cycle, a Brayton open-system air cycle and a Rankine closed-system cycle.
Figure 4B:
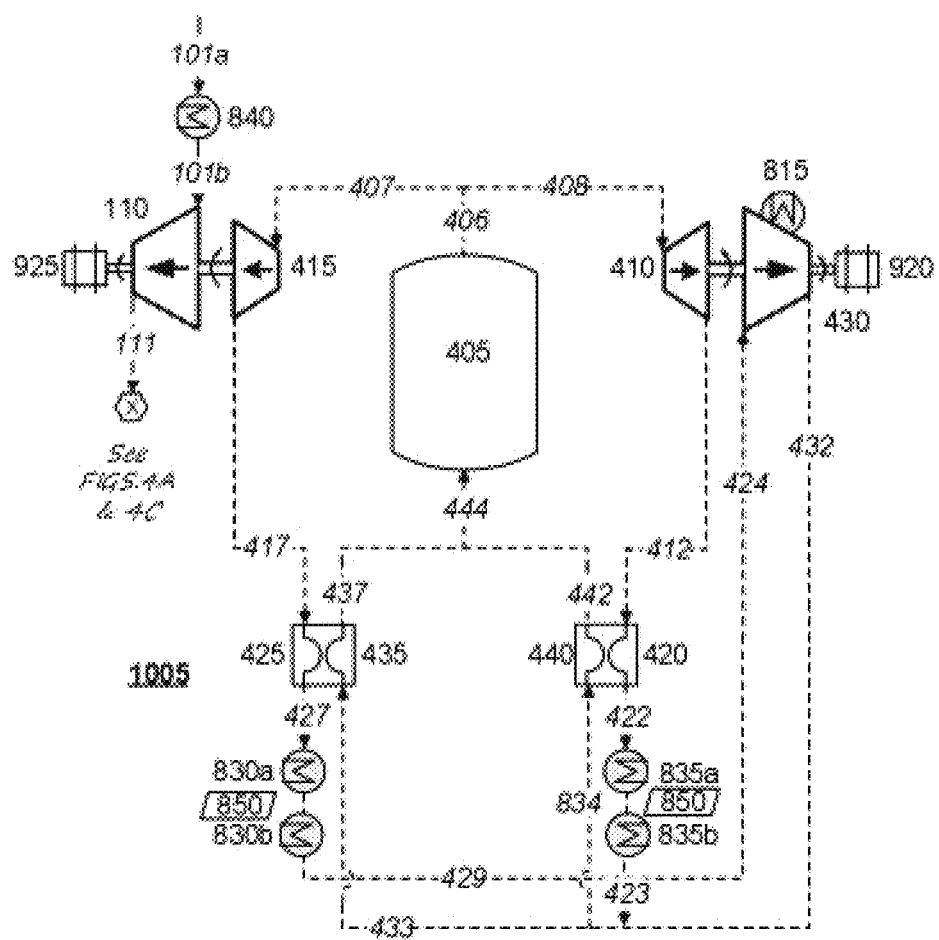
FIG. 4B illustrates an overview of a Brayton closed-system nuclear cycle integrated with a portion of a Brayton open-system air cycle.
Figure 4C:
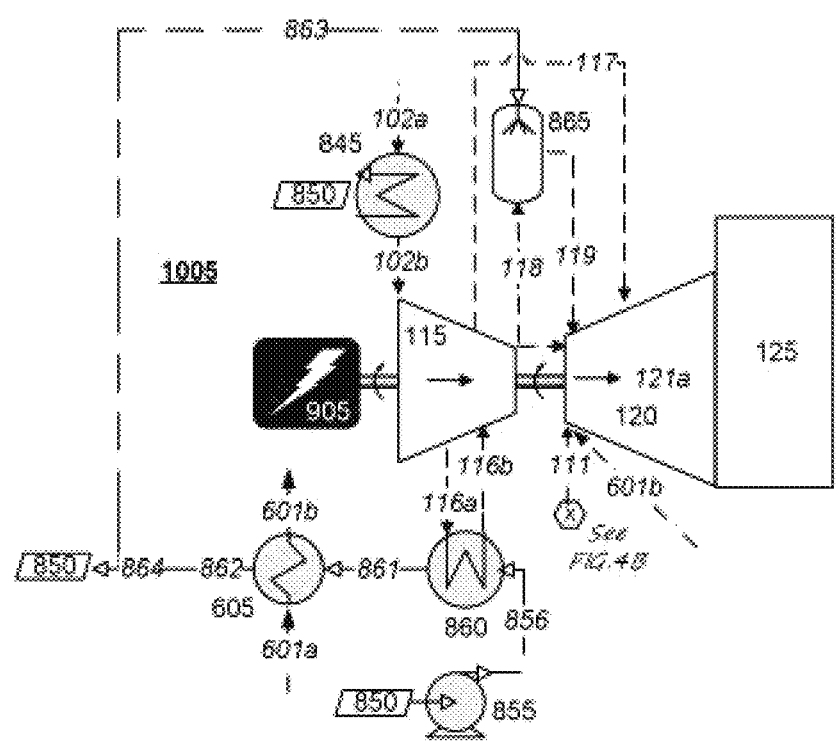
FIG. 4C illustrates a portion of a Brayton open-system air cycle employing a dedicated cooling compressor.

Referring to FIGS. 4A, 4B, and 4C of power plant 1005 of another embodiment of the invention involves a hybrid-nuclear integration of a Brayton open-system air cycle 100, closed-system Rankine closed-system cycle 200, Brayton closed-system supercritical $CO_2$ cycle 300, and Brayton closed-system nuclear cycle 400 employed to drive the main air compressor of the Brayton open-system air cycle 100. The Brayton closed-system nuclear cycle 400 consists of a working gas (e.g., helium), a nuclear reactor 405, a plurality of turbines 410 and 415, a plurality of recuperators 440/420 and 425/435, a plurality of cooling heat exchangers 830 and 835, a plurality of high pressure compressor(s) 430 driven by a plurality of turbine(s) 410 of the Brayton closed-system nuclear cycle 400, and a plurality of compressor(s) 110 of the Brayton open-system air cycle 100 driven by a plurality of turbine(s) 415 of the Brayton closed-system nuclear cycle 400.

Referring to power plant 1005 of FIGS. 4A and 4B, the additional embodiment of the invention employing a Brayton closed-system nuclear cycle 400 is described in detail. Very hot high pressure gas 406 discharged from nuclear reactor 405 is directed by a conduit or pipe header to a plurality of parallel conduits or pipes that transport very hot high pressure gases 407 and 408 to parallel high pressure turbine 410 (which drives compressor 430 cooled by intercooler 815) and high pressure turbine 415 (which drives compressor 110 of the Brayton open-system air cycle 100). Hot intermediate pressure gases 417 and 412 (discharged respectively from parallel turbines 415 and 410) are directed by parallel conduits or pipes to parallel recuperator heat exchangers 425/435 and 440/420. Referring to recuperator heat exchanger 425/435, intermediate pressure gas 417 transfers energy to high pressure gas 433 entering recuperator heat exchanger 425/435. Referring to recuperator heat exchanger 440/420, intermediate pressure gas 412 transfers energy to high pressure gas 434 entering recuperator heat exchanger 440/420. Conduits or pipes direct intermediate pressure gases 427 and 422 to parallel heat exchanger coolers 830 and 835; the coolers can be associated with refrigeration or absorption cooling systems 850 used to enhance the efficiency of the overall integrated thermal cycle by reducing the temperature of fluids entering compressors. Conduits or pipes direct cooled intermediate pressure merged gases 429 and 424 to intercooled (heat exchanger 815) compressor 430. High pressure gas 432 exiting compressor 430 is directed by conduits or pipes to recuperator heat exchangers 425/435 and 440/420 where energy is transferred into high pressure gases 433 and 434 from intermediate pressure gases 417 and 412. Conduits or pipes transport high pressure gases 437 and 442 from recuperator heat exchangers 425/435 and 440/420 and combine the gases into high pressure gas 444 directed by a conduits or pipes to nuclear reactor 405, thereby re-initializing the Brayton closed-system nuclear cycle 400 cycle. Motor/generators 925 and 920 provide the rotational forces needed for initial start-up of turbines 410 and 415 as well as providing auxiliary electrical energy.

Referring to FIGS. 4A, 4B an 4C of power plant 1005, an embodiment of the disclosure involves enhancing the Brayton open-system air cycle 100 relative to that of power plant 1000 of FIG. 3. As illustrated by FIG. 4C, a dedicated intercooled compressor 115 and saturator 865 are employed with gas turbine 120 to enhance the cooling of turbine 120 materials, thereby supporting higher gas turbine 120 firing temperatures, which in turn support increased output as well as efficiency. Refrigeration or absorption cooling system 850 fluid 863 associated with the compressor 115 intercooler 860 is evaporated into Brayton open-system air cycle 100 fluid 118 entering saturator 865 from compressor 115, thereby resulting in reduced temperature fluid 119 used to cool turbine 120 components such as stators and blades. Similarly, Brayton open-system air cycle 100 compressor 115 working fluid 117 can be used to cool turbine 120 parts such as stators and rotors. Additionally, the temperature of Brayton open-system air cycle 100 working fluid 102b entering compressor 115 of FIG. 4C and temperature of working fluid 101b entering compressor 110 of FIG. 4B can be reduced by using cooled fluids created by refrigeration or absorption cooling system 850 that uses waste energy from various heat exchanger, e.g., 860 of FIG. 4C and 830 and 835 of FIG. 4B. Referring to FIG. 4C, heated fluid 861 of refrigeration or absorption cooling system 850 can be used to preheat fuel gas 601a used by turbine 120 of FIG. 4A, thereby increasing the efficiency of power plant 1005.

Referring to FIG. 4A of hybrid-nuclear power plant 1005, the integration of an enhanced Brayton open-system air cycle 100, closed-system Rankine closed-system cycle 200, and Brayton closed-system supercritical $CO_2$ cycle 300 parallels that described earlier in conjunction with FIG. 3. Broadly, as illustrated by FIG. 4A of power plant 1005, energy transfer between a Rankine closed-system cycle 200, Brayton closed-system supercritical $CO_2$ cycle 300 and enhanced Brayton open-system air cycle 100 is accomplished using a plurality of heat exchanger and recuperators. A plurality of heat exchangers located in EMU 125 of the enhanced Brayton open-system air cycle 100 sequentially transfer energy from enhanced Brayton open-system air cycle 100 to both the Brayton closed-system supercritical $CO_2$ cycle 300 and to Rankine closed-system cycle 200. A plurality of heat exchangers and recuperators are used to sequentially transfer energy from intermediate pressure supercritical $CO_2$ of the Brayton closed-system supercritical $CO_2$ cycle 300 to both the high pressure supercritical $CO_2$ of the Brayton closed-system supercritical $CO_2$ cycle 300 and the high pressure liquid and vapor of the Rankine closed-system cycle 200. A plurality of supercritical $CO_2$ turbine(s) 350 of Brayton closed-system supercritical $CO_2$ cycle 300 efficiently optimized the use the HRU 125 heat source 121b energy while the Rankine closed-system cycle 200 is efficiently optimized by using HRU 125 heat source 121c to support the practical capabilities of steam turbines 245 and 265. HRU 125 heat exchangers 235 and 255 are illustrated by FIG. 4A in a series configuration but a parallel/series configuration could also be employed.

A further embodiment of the disclosure consists of not intercooling compressor 115 of FIG. 4C and not employing saturator 865, thereby simplifying compressor 115. This embodiment would, however, result in reduced efficiency and electrical generation relative to the preferred embodiment of FIGS. 4A, 4B and 4C.

Referring to FIGS. 4A, 4B, and 4C of the integrated hybrid-nuclear power plant 1005, TABLES 1 and 2 provide illustrative energy balance information for the embodiment of the invention involving the integration of a Brayton open-system air cycle 100, closed-system Rankine closed-system cycle 200, Brayton closed-system supercritical $CO_2$ cycle 300, and Brayton closed-system nuclear cycle 400. Referring to TABLES 1 and 2, the Baseline hybrid-nuclear configuration consists of a conventional Rankine closed-system cycle 200 employing three reheat steam turbines similar to that illustrated by FIG. 1, but with FIGS. 4A, 4B and 4C illustrating the configuration of Brayton open-system air cycle 100 compressors 110 and 115 and gas turbine 120. Case A is the Hybrid-nuclear configuration of FIGS. 4A, 4B and 4C with no HRU 125 duct firing 605. Case B is the Hybrid-nuclear configuration of FIGS. 4A, 4B and 4C with additional energy provided to HRU 125 by way of duct firing 605 using fuel 602—heat source 121b is roughly 13% hotter than heat source 121a.

TABLE 1

Power Plant 1005
Integrated Hybrid-Nuclear - Illustrative Performance Expectations

| Parameter | Baseline | Case A | Case B |
|---|---|---|---|
| Net Generation Increase | 0% | ~8% | ~19% |
| Efficiency Increase* | 0% | ~8% | ~12% |

*Higher Heating Value

TABLE 2

Power Plant 1005
Integrated Hybrid-Nuclear - Illustrative Energy Utilization

| Energy Inputs | Baseline | Case A | Case B |
|---|---|---|---|
| Nuclear Fuel | ~35% | ~35% | ~33% |
| Fossil Fuel | ~65% | ~65% | ~67% |
| Cycle 100: Brayton open-system air cycle | | | |
| From Fossil Fuel 601 (Heat Source 121a) | 100% | 100% | ~91% |
| From Fossil Fuel 602 (Heat Source 121b) | 0% | 0% | ~9% |
| Cycle 200: Rankine Cycle | | | |
| From Cycle 300, Brayton closed-system Supercritical $CO_2$ (Heat Exchangers 210, 215, 225, 250) | 0% | ~42% | ~30% |
| From Cycle 100, Brayton open-system air cycle (HRU 125 Heat exchangers 220, 230, 235, 255) | 100% | ~58% | ~70% |
| Cycle 300: Brayton closed-system Supercritical $CO_2$ | | | |
| From Cycle 300, Brayton closed-system Supercritical $CO_2$ (Recuperators 310/370, 320/365, 330/360, 340/355) | 0% | ~46% | ~53% |
| From Cycle 100, Brayton open-system air cycle (HRU 125 Heat exchangers 315, 325, 335, 345) | 0% | ~54% | ~47% |
| Cycle 400: Brayton closed-system Nuclear Cycle | | | |
| From Reactor | 100% | 100% | 100% |

Referring to power plant 1005, TABLES 1 and 2 illustrate that the through the integration of Brayton open-system air cycle 100, Rankine closed-system cycle 200, Brayton closed-system supercritical $CO_2$ cycle 300 and Brayton closed-system nuclear cycle 400, the utilization of fossil fuel energy source 600 and reactor heat source 800 is more practically and efficiently achieved. The energy collectively directed from the Rankine closed-system cycle 200 and Brayton closed-system supercritical $CO_2$ cycle 300 to the ultimate heat sink(s) (i.e., the environment) is reduced, thereby improving efficiency and output. Similar improvements would occur relative to the disclosure's embodiment of FIG. 3. The TABLES provide illustrative examples but do not necessarily define the optimum distribution of energy transfer between the cycles.

Figure 5A:
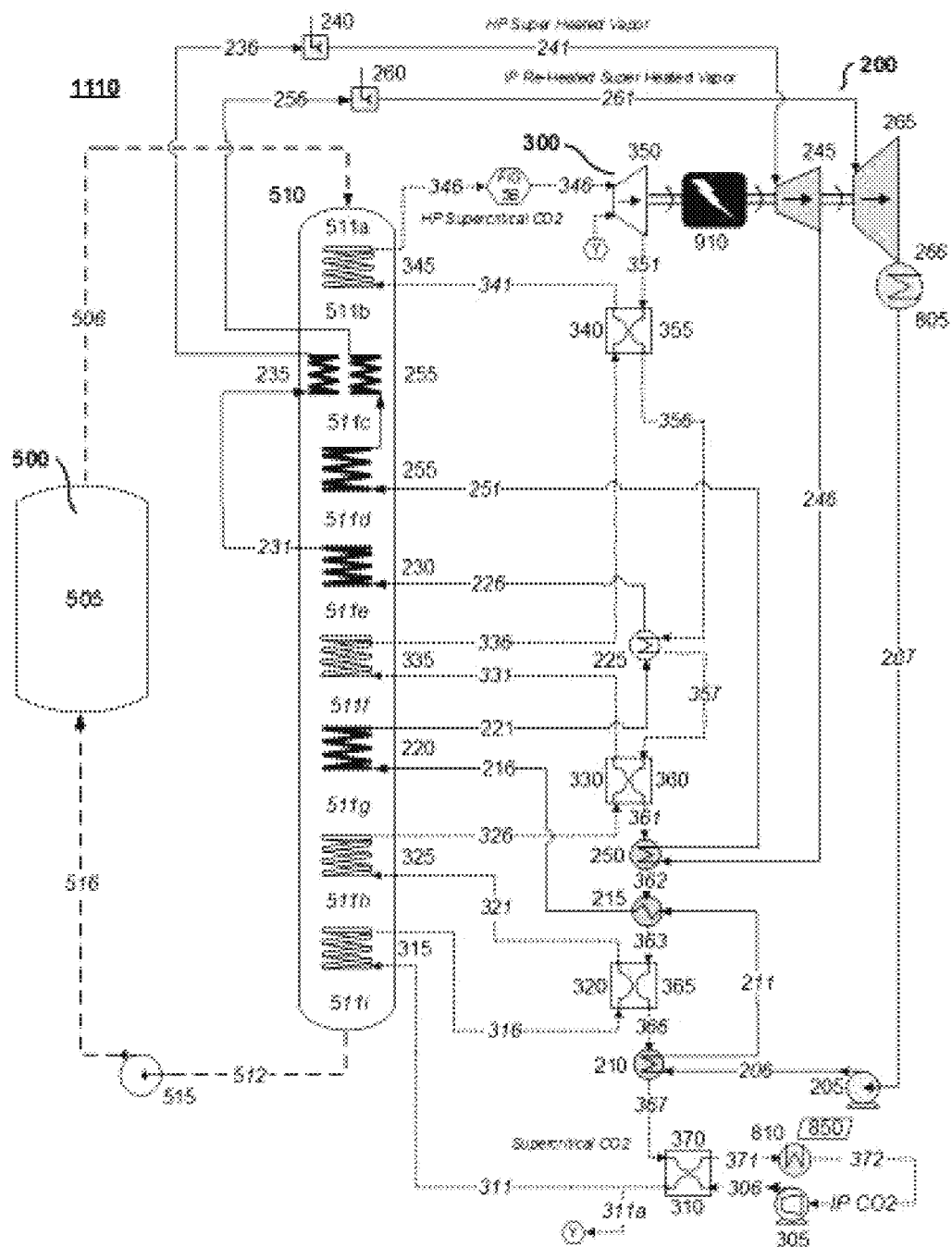
FIG. 5A illustrates a nuclear reactor heat source, Brayton closed-system supercritical $CO_2$ cycle, and a Rankine closed-system cycle.

Referring to power plant 1010 of FIG. 5A, a further embodiment of the disclosure involves a nuclear reactor system 500 employed with a closed-system Brayton closed-system supercritical $CO_2$ cycle 300 and a closed-system Rankine closed-system cycle 200. A plurality of conduits or pipes transfer hot nuclear system working fluid 506 from nuclear reactor 505 to HRU 510 where heat sources 511a through 511i transfer energy to a plurality of heat exchangers associated with a Brayton closed-system supercritical $CO_2$ cycle 300 and closed-system Rankine closed-system cycle 200. A plurality of conduits or pipes transport cooled nuclear system working fluid 512 from HRU 510 to pump/circulator 525 where a plurality of conduits or pipes transport pressurized working fluid 516 to reactor 505, thereby reinitializing the nuclear reactor system 500. The energy transfer between the Brayton closed-system supercritical $CO_2$ cycle 300 and closed-system Rankine closed-system cycle 200 parallels that described for the embodiments of the disclosure illustrated and previously described for FIG. 3 for power plant 1000 and illustrated and previously described for FIGS. 4A, 4B, and 4C for power plant 1005. Reactor fluids 506/511/512/516 are not limited to a particular type and could be a gas, liquid, liquid metal, liquid salt or liquid fluid containing fissile material. Additionally, the nuclear reactor system 500 could include an intermediate heat transfer loop comprised of a second HRU to separate the primary reactor fluid 506/512 a working fluid employed with HRU 510, thereby avoiding or minimizing radioactive contamination and safety issues between the reactor and Brayton closed-system supercritical $CO_2$ cycle 300 and Rankine closed-system cycle 200.

Figure 5B:
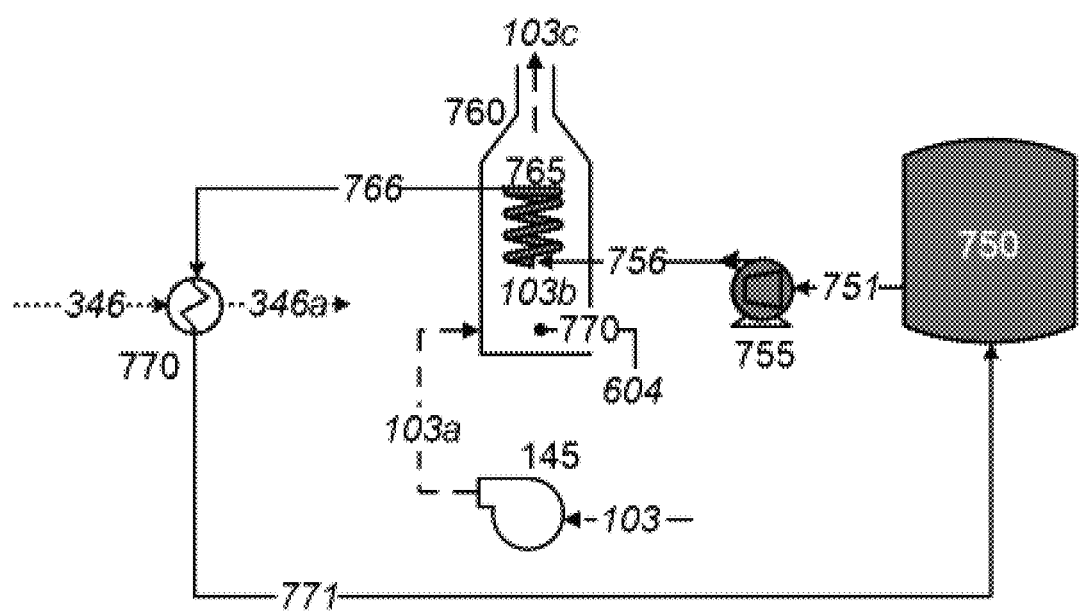
FIG. 5B illustrates a method to add supplemental heat to a Brayton closed-system supercritical $CO_2$ cycle employed with a nuclear heat source.

Referring power plant 1010, FIG. 5B, a further embodiment of the disclosure involves adding additional energy to the high pressure high temperature supercritical $CO_2$ of the supercritical $CO_2$ Brayton cycle prior to said supercritical $CO_2$ entering the high pressure high temperature turbine of said supercritical $CO_2$ Brayton cycle. A plurality of conduits or pipes direct a supplemental heating system working fluid 751 from working fluid storage tank(s) 750 to a plurality of pump(s) 755 that direct working fluid 756 to a plurality of heater(s) 760 that transfers ignited fuel energy 604 to heating system working fluid 756 directed by a plurality of conduits to a plurality heat exchanger(s) 770 wherein hot supplemental heating system working fluid 766 transfers energy to supercritical $CO_2$ Brayton cycle high temperature high pressure supercritical $CO_2$ working 346a exiting a plurality of heat exchanger(s) 765 and subsequently directed by a plurality of conduits or pipes to a plurality of supercritical $CO_2$ high pressure high temperature turbine(s) 350. The plurality of heater(s) 760 are comprised of a heat exchanger 765 and burner 772 fired by a fuel 604, with blower 145 directing atmospheric air 103 through heater(s) 760. A plurality of conduits or pipes transport reduced temperature working fluid 771 from heat exchanger 770 to a plurality of working fluid storage tank(s) 750, thereby re-initializing the supplemental heating system. The working fluid of the supplemental heating system can include a variety of fluids, including molten salt, liquid metals, and vapors. Additional energy could be added to the working fluid of the nuclear reactor or working fluid of an intermediate heat transfer loop employing the supplemental heating system similar to that illustrated by FIG. 5B.

Figure 6:
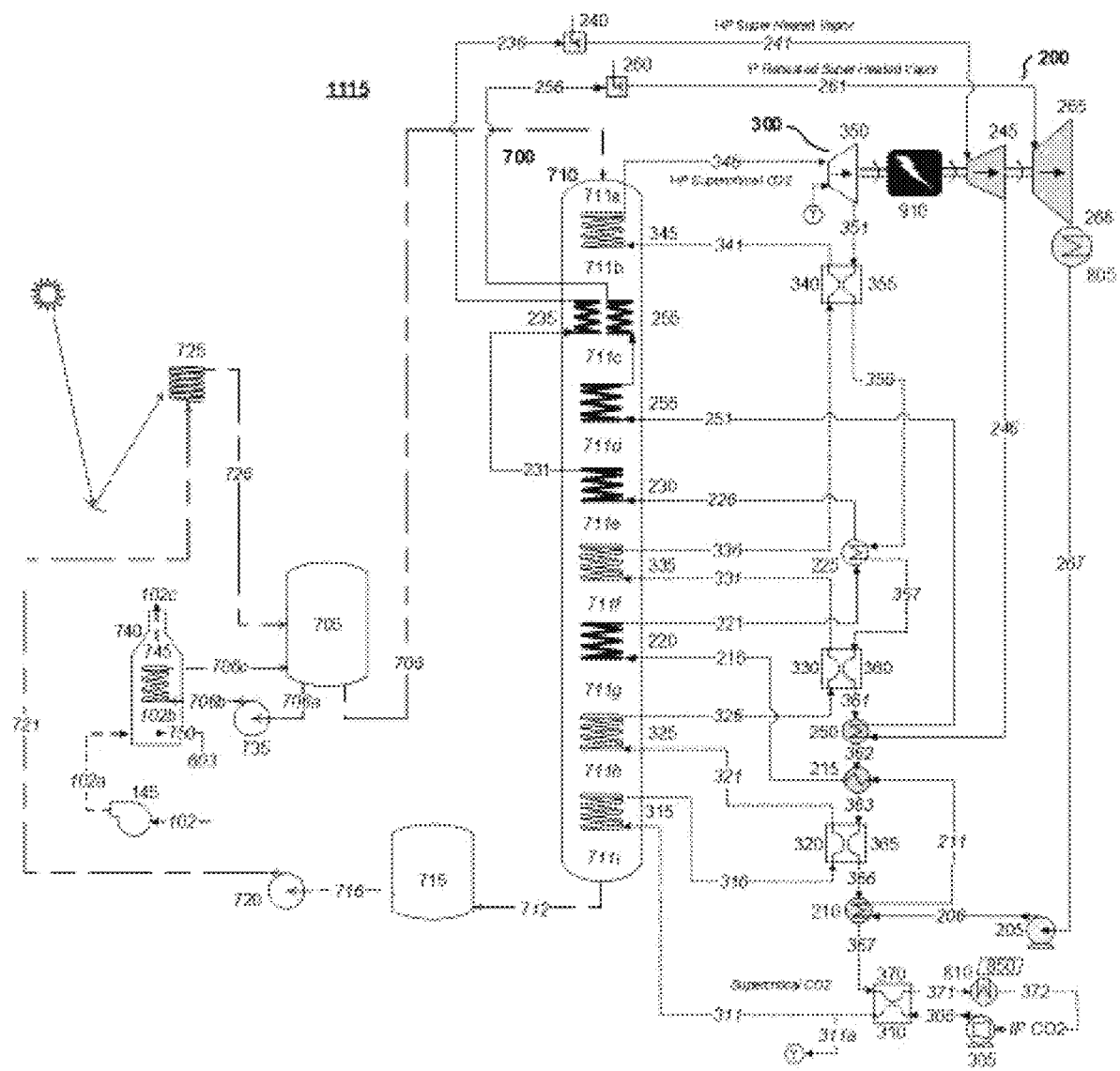
FIG. 6 illustrates a solar energy heat source, Brayton closed-system supercritical $CO_2$ cycle, and a Rankine closed-system cycle.

Referring to power plant 1015 of FIG. 6, a further embodiment of the disclosure involves a solar energy system 700 employed with a closed-system Brayton closed-system supercritical $CO_2$ cycle 300 and closed-system Rankine closed-system cycle 200. A plurality of conduits or pipes transfer hot solar system working fluid 706 from a plurality of solar energy system 700 working fluid storage tank 705 to HRU 710 where heat sources 711a through 711i transfer energy to a plurality of heat exchangers associated with a Brayton closed-system supercritical $CO_2$ cycle 300 and closed-system Rankine closed-system cycle 200. A plurality of conduits or pipes transport cooled solar system working fluid 712 from HRU 710 to a reduced-temperature solar system working fluid storage tank 715 from which a plurality of conduits or pipes transfer said solar system working fluid 716 to pump/circulator 720 where a plurality of conduits or pipes transport pressurized solar system working fluid 721 to solar receiver 725, from which a plurality conduits or pipes transfer high temperature solar system fluid 726 to solar system working fluid storage tank 705, thereby reinitializing the solar energy system 700. The energy transfer between the Brayton closed-system supercritical $CO_2$ cycle 300 and closed-system Rankine closed-system cycle 200 parallels that described for the embodiments of the disclosure illustrated and previously described for FIG. 3 for power plant 1000 and illustrated and previously described for FIGS. 4A, 4B, and 4C for power plant 1005. Solar system working fluids 706/712/716/721/726 are not limited to a particular type and could be a gas, liquid, liquid metal, or liquid salt.

Referring to power plant 1015 of FIG. 6, a further embodiment of the disclosure involves adding additional energy to the high temperature solar energy system 700 working fluid 706a circulated between a plurality of storage tank(s) 705 and plurality of heater(s) 740, with heated solar energy system 700 working fluid 706c returned to storage tank(s) 705. Supplemental heating system heater 740 is comprised of heat exchanger 745 and burner 752 fired by a fuel 603 with blower 145 directing atmospheric air 102 through heater 740. A plurality of conduits or pipes direct hot solar energy system working fluid 706a from a plurality of high temperature working fluid storage tank(s) 705 to a plurality of pump 735 that direct working fluid 706b to a plurality of heater(s) 740 where ignited fuel energy 603 transfer energy to working fluid 706c directed by a plurality of conduits or pipes to working fluid storage tank 705, thereby re-initialized the supplemental heating system.

Referring to power plants 1000, 1005, 1110 and 1115 of FIGS. 3, 4, 5, and 6, a further embodiment of the disclosures is comprised of employing clutches with a plurality of generator(s) 910 and plurality of supercritical $CO_2$ turbine(s) 350 and plurality of intermediate pressure Rankine closed-system cycle 200 turbine(s) 245, allowing generator(s) 910 to disengage from the plurality of turbines 245 and 350 and thereby allow the plurality of generator(s) 910 to operate as a synchronous condenser during periods when power plants 1000, 1005, 1010 and 1115 are offline. Such a feature helps stabilize power grids subjected to intermittent renewable energy while providing an additional revenue source for power plants 1000, 1005, 1010, and 1015.

The disclosure's embodiments share a common feature whereby Brayton closed-system supercritical $CO_2$ cycle 300 energy transfer is accomplished by employing a plurality of heat exchangers and recuperator heat exchangers as opposed to employing a few recuperator heat exchangers, as illustrated by FIG. 2. TABLE 3 illustrates the difference.

TABLE 3

ILLUSTRATIVE COMPONENT CONTRASTS

| | Configuration | | | |
|---|---|---|---|---|
| Component - Supercritical $CO_2$ Heat Transfer | FIG. 2 | FIG. 3 | FIGS. 4A, 4B, 4C | FIG. 5A |
| Recuperator Heat Exchanger | 2 | 4 | 4 | 4 |
| Heat Exchanger | 0 | 4 | 4 | 4 |
| NET | 2 | 8 | 8 | 8 |

The use of a plurality of heat exchangers concurrently employing differing fluids (including supercritical $CO_2$) with dissimilar properties in conjunction with a number of recuperator heat exchangers allows for more efficient and pragmatic overall heat transfer that is not realistically practical when only a few recuperators are exclusively employed. The embodiments also employ a plurality of integrated Rankine closed-system cycle 200 evaporator heat exchangers that allow for more efficient heat transfer between the pluralities of thermal cycles.

Referring to power plants 1000, 1005, 1010 and 1015, embodiments of the disclosure use of a Rankine closed-system cycle 200 with the other thermal cycles, thereby readily supporting a wide range of applications including: industrial processes; chemical production; cogeneration; municipal heating/cooling; desalination. All manner of steam pressures and temperatures are available using steam turbine extraction and/or steam de-superheaters and pressure reducing valves. Sole use of a supercritical $CO_2$ cycle has limited flexibility in support of such applications.

The use of a plurality of thermal cycles with the Brayton open-system air cycle 100 allows for simpler control of the closed-system Rankine closed-system cycle 200 because fewer and simpler Rankine closed-system cycle 200 turbines can be used.

Referring to power plants 1000, 1005, 1010 and 1015, the embodiments of the disclosure can use a plurality of air cooled condenser heat exchanger(s) 805 to transfer Rankine closed-system cycle 200 energy to the atmosphere ultimate heat sink from low-pressure Rankine closed-system cycle 200 working fluid discharged from the Rankine closed-system cycle 200 intermediate pressure turbine, thereby condensing the Rankine closed-system cycle 200 working fluid to a liquid state. The embodiments of the disclosure can also use a plurality of water cooled condenser heat exchangers 805 to transfer Rankine closed-system cycle 200 energy to the atmosphere ultimate heat sink by way of using a plurality of forced mechanical draft or natural daft cooling towers in which cooling system working fluid water is circulated between the condenser heat exchanger(s) 805 and mechanical or natural draft cooling tower(s). The embodiments of the disclosure can also use a plurality of water cooled condenser heat exchanger(s) 805 to transfer Rankine closed-system cycle 200 energy to an ultimate heat sink in the form of a river, lake or ocean by directing, using a plurality of pumps, river, lake or ocean cooling water to the plurality of condenser heat exchanger(s) 805 and then returning the heated water to the river, lake, or ocean.

Referring to power plants 1000, 1005, 1010 and 1015, Brayton cycle heat exchanger coolers 810, 830 and 835 transfer Brayton open-system air cycle 100 and Brayton closed-system supercritical $CO_2$ cycle 300 energy to the coolest ultimate heat sinks by moving cooling system working fluid through the plurality of heat exchanger coolers 810, 830 and 835. Refrigeration or absorption cooling system 850 could also be used to further reduce the temperature of the cooling system working fluid, thereby reducing the energy required to pressurize and/or compress cycles 100, 300 and 400 working fluids. Refrigeration or absorption cooling system 850 could be an absorption system using waste heat from the thermal cycles 100, 300 or 400 and/or a mechanical compression refrigeration system.

The use of the Brayton closed-system supercritical $CO_2$ cycle 300 allows for more practical use of very hot energy discharged by the gas turbine of the Brayton open-system air cycle 100 because modest temperature high pressure supercritical $CO_2$ can be used to cool supercritical $CO_2$ turbine rotors, stators and materials initially exposed to high temperature high pressure supercritical $CO_2$ entering the supercritical $CO_2$ turbine(s). The cooled supercritical $CO_2$ turbines also support supplemental heating of the Brayton closed-system supercritical $CO_2$ cycle and open-system Brayton, as described previously and summarized in the following paragraph.

Referring to power plants 1000 (FIG. 3), 1005 (FIG. 4A), 1110 (FIG. 5B) and 1115 (FIG. 6), embodiments of the disclosure can use supplementally-fired heaters to augment heat source energy. Such augmented heat source energy increases the ability of said power plants to provide additional peaking energy to the electrical grid. Said additional energy can be derived from a variety of fossil fuels such as natural gas, gasified coal, and/or liquid fossil fuel. Said additional energy can also be derived from hydrogen derived from the electrolysis of water and wherein said hydrogen can be stored to support grid peaking applications and wherein said electrolysis input energy can be provided from intermittent renewable energy sources such as solar panels or wind turbines. No $CO_2$ emissions occur when renewable energy sources provide the energy for electrolysis derived hydrogen used in support of power plant 1000, 1005, 1010, and 1015 temporary power increases.

The embodiments of this disclosure include methods to use temperature differences between heat sources and heat sinks through the integration of a plurality of thermodynamic cycles, thereby improving plant efficiencies, attendant power outputs, and power plant economics. Although a combination of features is shown in the illustrated examples, not all of them need be combined to realize the benefits of the various embodiments of this disclosure. In other words, a system designed according to an embodiment of this disclosure will not necessarily include all the features shown in any one of the figures or all of the portions schematically shown in the figures. Moreover, selected features of one example embodiment may be combined with selected features of other example embodiments.

The preceding descriptions are exemplary rather limiting in nature. Variations and modifications that do not necessarily depart from the essence of this disclosure to the disclosed examples may become apparent to those skilled in the art.

Having thus described the invention, what is claimed as new and desired to be secured by Letters Patent is as follows:

1. An integrated energy system comprising:
a Brayton open-system air cycle,
a Brayton closed-system supercritical $CO_2$ cycle, and
a Rankine closed-system cycle,
wherein both said Brayton open-system air cycle and said Brayton closed-system supercritical $CO_2$ cycle of said integrated energy system comprise a plurality of heat sources from which energy is transferred to said Brayton closed-system supercritical $CO_2$ cycle and said Rankine closed-system cycle,
wherein said Brayton open-system air cycle is comprised of a working fluid, a plurality of compressors, a plurality of turbines, a plurality of heat exchangers, and a plurality of electrical generators,
wherein low temperature low-pressure working fluid of said Brayton open-system air cycle is pressurized by an at least one of a plurality of compressors of said Brayton open-system air cycle, wherein fuel is injected into said Brayton open-system air cycle pressurized working fluid discharged from at least one of said compressors of said Brayton open-system air cycle, wherein a working fluid/fuel mixture is ignited, and wherein a high temperature high pressure working fluid of said Brayton open-system air cycle is directed into at least one of a plurality of turbines that rotate at least one of a plurality of said Brayton open-system air cycle compressors, said open-system high pressure high temperature working fluid directed into at least one of a plurality of turbines that rotate a plurality of electrical generators of said Brayton open-system air cycle, wherein low-pressure high temperature working fluid gases exhausted from said gas turbines of said Brayton open-system air cycle constitute a high temperature energy source directed into a heat recovery unit comprised of a plurality of heat exchangers further comprised to transfer exhaust gas heat source energy of said Brayton open-system air cycle into said Rankine closed-system cycle and into said Brayton closed-system supercritical $CO_2$ cycle, wherein Brayton open-system air cycle low temperature working fluid exhaust gas is directed into the atmospheric ultimate heat sink, wherein said Brayton closed-system supercritical $CO_2$ cycle is comprised of a supercritical $CO_2$ working fluid, a plurality of pumps/compressors, a plurality of heat exchangers, a plurality of recuperator heat exchangers and plurality of turbines that rotate a plurality of electrical generators, wherein a plurality of Brayton open-system air cycle heat recovery unit heat exchangers transfer Brayton open-system air cycle exhaust-gas heat source energy to high pressure supercritical $CO_2$ of said Brayton closed-system supercritical $CO_2$ cycle, wherein a plurality of recuperator heat exchangers of said Brayton closed-system supercritical $CO_2$ cycle transfer supercritical $CO_2$ Brayton cycle heat source energy from intermediate pressure supercritical $CO_2$ to said high pressure supercritical $CO_2$ of said Brayton closed-system supercritical $CO_2$ cycle, wherein high pressure, high temperature supercritical $CO_2$ enters a plurality of high pressure supercritical $CO_2$ turbines that rotate a plurality of electrical generators, wherein intermediate pressure high temperature supercritical $CO_2$ of said Brayton closed-system supercritical $CO_2$ cycle is discharged from the plurality of supercritical $CO_2$ turbines and directed to a plurality of heat exchangers and recuperator heat exchangers that transfer intermediate pressure supercritical $CO_2$ heat source energy to high pressure supercritical $CO_2$ of said Brayton closed-system supercritical $CO_2$ cycle and transfer intermediate pressure supercritical $CO_2$ heat source energy to high pressure and intermediate pressure working fluids of said Rankine closed-system cycle, wherein intermediate pressure, reduced temperature supercritical $CO_2$ is cooled by a plurality of heat exchangers that transfer energy to the ultimate heat sink, wherein the intermediate pressure-cooled $CO_2$ of said Brayton closed-system supercritical $CO_2$ cycle is repressurized to a high pressure supercritical state by a plurality of pumps/compressors, thereby re-initializing said Brayton closed-system supercritical $CO_2$ cycle, wherein said Rankine closed-system cycle is comprised of a working fluid, a plurality of pumps, a plurality of heat exchangers, a plurality of turbines and a plurality of electrical generators, wherein said Brayton open-system air cycle heat source energy is transferred to high pressure working fluid of said Rankine closed-system cycle from said Brayton open-system air cycle heat exchangers of said Brayton open-system air cycle heat recovery unit, wherein Brayton closed-system supercritical $CO_2$ cycle heat source energy is transferred to said high pressure working fluid of said Rankine closed-system cycle from Brayton closed-system supercritical $CO_2$ cycle intermediate pressure heat exchangers, and wherein Brayton closed-system supercritical $CO_2$ cycle intermediate pressure heat source energy is transferred to said Rankine closed-system cycle intermediate pressure working fluids from Brayton closed-system supercritical $CO_2$ cycle heat exchangers, wherein Rankine closed-system cycle high temperature, high pressure working fluids are directed to a plurality of high pressure Rankine closed-system cycle turbines rotating a plurality of generators, wherein intermediate pressure intermediate temperature Rankine working fluids discharged from the plurality of high pressure Rankine closed-system cycle turbines are reheated by intermediate pressure heat source energy from a plurality of supercritical $CO_2$ heat exchangers of said Brayton closed-system supercritical $CO_2$ cycle, wherein intermediate pressure intermediate temperature Rankine working fluids are further reheated by a plurality of heat recovery unit heat exchangers of said Brayton open-system air cycle, wherein said Rankine closed-system cycle reheated, high temperature, intermediate pressure working fluids are directed to a plurality of intermediate pressure Rankine closed-system cycle turbines rotating a plurality of generators, wherein low-pressure low temperature Rankine closed-system cycle working fluids discharged from the plurality of intermediate pressure Rankine closed-system cycle turbines are directed to a plurality of cooling heat exchangers that condense the Rankine closed-system cycle working fluid and transfer energy to the ultimate heat sink, and wherein the condensed low-pressure Rankine closed-system cycle working fluids are directed to a plurality of Rankine closed-system cycle pumps that re-pressurization said Rankine closed-system cycle fluids to high pressure, thereby re-initializing said Rankine closed-system cycle.

2. The integrated energy system of claim 1 wherein high pressure, low-to-intermediate temperature supercritical $CO_2$ cools portions of the plurality of high pressure supercritical $CO_2$ turbines exposed to high temperature high pressure supercritical $CO_2$, thereby allowing use of very hot high pressure supercritical $CO_2$ and avoiding overheating the plurality of high pressure high temperature supercritical $CO_2$ turbines.

3. The integrated energy system of claim 1 wherein additional energy is added to the exhaust gas working fluid discharged from the plurality of gas turbines of said Brayton open-system air cycle, thereby augmenting said Brayton open-system air cycle heat source energy, wherein said additional energy can be derived from a variety of fossil fuels such as natural gas, gasified, and/or liquid fossil fuel, and/or wherein said additional energy can include hydrogen gas created by electrolysis of water and wherein said hydrogen can be stored to support grid peaking applications and wherein said electrolysis energy can be provided from renewable energy sources, and thereby increasing the ability of the integrated energy system of claim 1 to provide additional peaking energy to an electrical grid.

4. The integrated energy system of claim 1 wherein clutches are provided to disengage generators rotated by said plurality of Rankine closed-system cycle turbine(s) and said plurality of Brayton closed-system supercritical $CO_2$ cycle turbine(s), thereby enabling said electrical generator(s) to act as a synchronous condenser during periods when said claim 1 energy generation system turbines are not operational, and thereby allowing said integrated generation system to support electrical grids subjected to intermittent renewable energy generating resources that can adversely impact the stability of the grid.

5. The integrated energy system of claim 1 wherein a refrigeration system is employed to provide low temperature fluids to heat exchanger used to cool the intermediate pressure working fluid supercritical $CO_2$ of the closed system supercritical $CO_2$ Brayton cycle to the fluid state prior to aid $CO_2$ working fluid entering the pump/compressors of said Brayton closed-system supercritical $CO_2$ cycle, and thereby increasing the ability of the integrated energy system of claim 1 to provide additional energy to an electrical grid during periods of high ambient temperatures.

6. The integrated energy system of claim 1 wherein a plurality of refrigeration system(s) provide low temperature fluids to the plurality of heat exchanger used to cool the low-pressure working fluid of said Brayton open-system air cycle prior to said low-pressure Brayton open-system air cycle working fluid entering the compressors of said Brayton open-system air cycle, and thereby increasing the ability of said integrated energy system to provide additional energy to the electrical grid during periods of high ambient temperatures.

7. The integrated energy system of claim 1 wherein the plurality of electrical generator(s) rotated by said plurality of turbine(s) of said Brayton open-system air cycle is used during start-up of said energy generation system to initially rotate the electrical generator/turbine/compressor machines.

8. The integrated energy system of claim 1 wherein de-superheaters are employed with said Rankine closed-system cycle high temperature, high pressure and said intermediate pressure high temperature fluids directed into said high temperature, high pressure turbine(s) and directed into said intermediate pressure high temperature turbine(s) of the said Rankine closed-system cycle, and thereby avoiding overheating of said plurality of said Rankine closed-system cycle high pressure and intermediate pressure turbine(s).

9. An integrated energy system comprising:
a Brayton closed-system nuclear cycle,
a Brayton open-system air cycle,
a Brayton closed-system supercritical $CO_2$ cycle, and
a Rankine closed-system cycle,
wherein said Brayton closed-system nuclear cycle provides an energy source, wherein said Brayton open-system air cycle and said Brayton closed-system supercritical $CO_2$ cycle of said integrated energy system comprise a plurality of heat sources from which energy is transferred to said Brayton closed-system supercritical $CO_2$ cycle and said Rankine closed-system cycle, wherein said Brayton closed-system nuclear cycle gas turbine cycle comprises a nuclear reactor heat source, a nuclear working fluid, a plurality of recuperator heat exchangers, a plurality of cooling heat exchangers, a plurality of compressors, and a plurality of turbines, wherein at least one turbine of said Brayton closed-system nuclear cycle rotates at least one compressor of said Brayton open-system air cycle, and at least one turbine of said Brayton closed-system nuclear cycle rotates at least one compressor of said Brayton closed-system nuclear cycle, wherein said Brayton closed-system nuclear cycle is comprised of a high pressure, high temperature nuclear working fluid that enters said nuclear reactor and is further heated by nuclear fuel, wherein said very high temperature high pressure nuclear working fluid exiting the reactor is directed to a plurality of Brayton nuclear cycle turbines, at least one of which rotates a primary air compressor of said Brayton open-system air cycle and wherein at least one of the Brayton nuclear cycle high pressure turbines rotates at least one of the plurality of said Brayton nuclear cycle compressors that pressurize the nuclear working fluid, and wherein intermediate pressure, high temperature working fluid of said Brayton closed-system nuclear cycle is discharged by said high pressure turbines of said Brayton closed-system nuclear cycle and directed to a plurality of recuperator heat exchangers that transfer intermediate pressure high temperature heat source energy of said nuclear working fluid to high pressure low temperature nuclear working fluid of said Brayton closed-system nuclear cycle, wherein reduced-temperature intermediate pressure nuclear working fluid of said Brayton nuclear cycle is discharged from said plurality of recuperator heat exchangers and further cooled by a plurality of heat exchangers that transfer energy to the ultimate heat sink, wherein cooled nuclear working fluid is directed to a plurality of compressors of said Brayton nuclear cycle and re-pressurized, thereby reinitializing said Brayton closed-system nuclear cycle, wherein said Brayton open-system air cycle comprises a working fluid, a plurality of compressors, a plurality of turbines, a plurality of heat exchangers, and a plurality of electrical generators, wherein the majority of low temperature low-pressure working fluid of said Brayton open-system air cycle is pressurized by a at least one of a plurality of compressors of said Brayton open-system air cycle, and said Brayton open-system air cycle compressor rotated by at least one of a plurality is turbines of said Brayton closed-system nuclear cycle, and wherein a minority of low temperature, low pressure working fluid of said Brayton open-system air cycle is pressurized by at least one a plurality of compressors rotated by at least one of a plurality of said turbines of said Brayton open-system air cycle, and wherein said working fluid provides cooling fluid to said turbines of said Brayton open-system air cycle, wherein fuel is injected into the majority of said Brayton open-system air cycle pressurized working fluid discharged from at least one of said compressors of said Brayton open-system air cycle, wherein said working fluid/fuel mixture is ignited, wherein said high temperature, high pressure working fluid of said Brayton open-system air cycle is directed into at least one of a plurality of turbines that rotate at least one of a plurality of said Brayton open-system air cycle compressors, wherein the high pressure, high temperature working fluid of said Brayton open-system air cycle is directed into at least one of a plurality of turbines that rotate a plurality of electrical generators of said Brayton open-system air cycle, wherein low-pressure high temperature working fluid gases exhausted from said gas turbines of said Brayton open-system air cycle constitute a high temperature energy source directed into a heat recovery unit comprised of a plurality of heat exchangers further comprised to transfer exhaust gas heat source energy of said Brayton open-system air cycle into said Rankine closed-system cycle and into said Brayton closed-system supercritical $CO_2$ cycle, wherein said Brayton closed-system supercritical $CO_2$ cycle comprises a supercritical $CO_2$ working fluid, a plurality of pumps/compressors, a plurality of heat exchangers, a plurality of recuperator heat exchangers and plurality of turbines that rotate a plurality of electrical generators, wherein a plurality of said Brayton open-system air cycle heat recovery unit heat exchangers transfer Brayton open-system air cycle exhaust gas heat source energy to high pressure supercritical $CO_2$ of said Brayton closed-system supercritical $CO_2$ cycle, wherein a plurality of recuperator heat exchangers of said Brayton closed-system supercritical $CO_2$ cycle transfer Brayton closed-system supercritical $CO_2$ cycle heat source energy from intermediate pressure supercritical $CO_2$ to said high pressure supercritical $CO_2$ of said Brayton closed-system supercritical $CO_2$ cycle, wherein high pressure high temperature supercritical $CO_2$ enters a plurality of high pressure supercritical $CO_2$ turbines that rotate a plurality of electrical generators, and wherein intermediate pressure high temperature supercritical $CO_2$ of said Brayton closed-system supercritical $CO_2$ cycle is discharged from the plurality of supercritical $CO_2$ turbines and directed to a plurality of heat exchangers and recuperator heat exchangers that transfer intermediate pressure supercritical $CO_2$ heat source energy to high pressure supercritical $CO_2$ of said Brayton closed-system supercritical $CO_2$ cycle and transfer intermediate pressure supercritical $CO_2$ heat source energy to high pressure and intermediate pressure fluids of said Rankine closed-system cycle, wherein intermediate pressure, reduced temperature supercritical $CO_2$ is cooled by a plurality of heat exchangers that transfer energy to the ultimate heat sink, wherein the intermediate pressure-cooled $CO_2$ of said Brayton closed-system supercritical $CO_2$ cycle is re-pressurized to a high pressure supercritical state by a plurality of pumps/compressors, thereby re-initializing said Brayton closed-system supercritical $CO_2$ cycle, wherein said Rankine closed-system cycle comprises a working fluid, a plurality of pumps, a plurality of heat exchangers, a plurality of turbines and a plurality of electrical generators, wherein said Brayton open-system air cycle heat source energy is transferred to high pressure fluid of said Rankine closed-system cycle from said Brayton open-system air cycle heat exchangers of said Brayton open-system air cycle heat recovery unit, wherein Brayton closed-system supercritical $CO_2$ cycle heat source energy is transferred to said high pressure fluid of said Rankine closed-system cycle from said Brayton closed-system supercritical $CO_2$ cycle intermediate pressure heat exchangers, wherein Brayton closed-system supercritical $CO_2$ cycle intermediate pressure heat source energy is transferred to said Rankine closed-system cycle intermediate pressure fluids from said Brayton closed-system supercritical $CO_2$ cycle heat exchangers, wherein Rankine closed-system cycle high temperature, high pressure fluids are directed to a plurality of high pressure Rankine closed-system cycle turbines rotating a plurality of generators, wherein intermediate pressure intermediate temperature Rankine fluids discharged from the plurality of high pressure Rankine closed-system cycle turbines are reheated by intermediate pressure heat source energy from a plurality of supercritical $CO_2$ heat exchangers of said Brayton closed-system supercritical $CO_2$ cycle, wherein intermediate pressure intermediate temperature Rankine fluids are further reheated by a plurality of heat recovery unit heat exchangers of said Brayton open-system air cycle, wherein said Rankine closed-system cycle reheated, high temperature, intermediate pressure working fluids are directed to a plurality of intermediate pressure Rankine closed-system cycle turbines rotating a plurality of generators, wherein low-pressure low temperature Rankine closed-system cycle working fluids discharged from the plurality of intermediate pressure Rankine closed-system cycle turbines are directed to a plurality of cooling heat exchangers that condense the Rankine closed-system cycle working fluid and transfer energy to the ultimate heat sink, wherein the condensed low-pressure Rankine closed-system cycle fluids are directed to a plurality of Rankine closed-system cycle pumps that re-pressurization said Rankine closed-system cycle fluids to high pressures, and thereby re-initializing said Rankine closed-system cycle.

10. The integrated energy system of claim 9 wherein compressor intercooling is used with the compressor that pressurizes the minority of said Brayton open-system air cycle working fluid employed to cool the high pressure high temperature turbine that rotates the electrical generator and uses the majority of said Brayton open-system air cycle working fluid, wherein said intercooler working fluid is heated by energy transferred by cooling the minority of working fluid being pressurized by said intercooled compressor of said Brayton open-system air cycle, wherein said heated intercooler working fluid supplies energy to a heat exchanger that preheats fuel used by said high pressure high temperature gas turbine of said Brayton open-system air cycle, wherein a portion of the intercooler working fluid downstream of the fuel heater is directed into a saturator that further cools said Brayton open-system air cycle working fluid that is directed to cool high temperature parts of the gas turbine fuel firing apparatus, and wherein the intercooled compressor of said Brayton open-system air cycle further provides cooled Brayton open-system air cycle gas turbine working fluid to stator/rotor components of the high pressure, high temperature gas turbine.

11. The integrated energy system of claim 9 wherein high pressure, low to intermediate temperature supercritical $CO_2$ cools portions of the plurality of high pressure supercritical $CO_2$ turbines exposed to high temperature high pressure supercritical $CO_2$, and thereby utilizing very hot high pressure supercritical $CO_2$ and avoiding overheating the plurality of high pressure high temperature supercritical $CO_2$ turbine(s).

12. The integrated energy system of claim 9 wherein additional energy is added to the exhaust gas working fluid discharged from the plurality of gas turbines of said Brayton open-system air cycle, thereby augmenting said Brayton open-system air cycle heat source energy, wherein said additional energy can be derived from a variety of fossil fuels such as natural gas, gasified, and/or liquid fossil fuel, and/or wherein said additional energy can include hydrogen created by electrolysis of water and wherein said hydrogen can be stored to support grid peaking applications and wherein said electrolysis energy can be provided from renewable energy sources such as solar or wind, and thereby providing additional peaking energy to the electrical grid.

13. The integrated energy system of claim 9 wherein clutches are provided to disengage generators rotated by said plurality of Rankine closed-system cycle turbine(s) and said plurality of Brayton closed-system supercritical $CO_2$ cycle turbine(s), thereby enabling said electrical generator(s) to act as a synchronous condenser(s) during periods when said energy generation system turbines are not operational, and thereby supporting electrical grids subjected to intermittent renewable energy generating resources.

14. The integrated energy system of claim 9 wherein a plurality of absorption refrigeration system(s) provide low temperature fluids to the plurality heat exchanger used to cool the intermediate pressure working fluid supercritical $CO_2$ of said Brayton closed-system supercritical $CO_2$ cycle to the fluid state prior to said $CO_2$ working fluid entering the pump/compressors of said Brayton closed-system supercritical $CO_2$ cycle, wherein moderate-temperature cooling water is employed with absorption chiller systems, and wherein said moderate temperature water is obtained from the plurality of coolers employed with the Brayton closed-system nuclear cycle, and thereby providing additional energy to the electrical grid during periods of high ambient temperatures.

15. The integrated energy system of claim 9 wherein a plurality of refrigeration system(s) provide low temperature fluids to heat exchanger used to cool the intermediate pressure working fluid supercritical $CO_2$ of said Brayton closed-system supercritical $CO_2$ cycle to the fluid state prior to aid $CO_2$ working fluid entering the pump/compressors of said Brayton closed-system supercritical $CO_2$ cycle, and thereby providing additional energy to the electrical grid during periods of high ambient temperatures.

16. The integrated energy system of claim 9 wherein the plurality of electrical generator(s) rotated by said turbine(s) of said Brayton open-system air cycle is used during start-up of said energy generation system to initially rotate the electrical generator/turbine/compressor machines.

17. The integrated energy system of claim 9 wherein plurality of motor/generator(s) are used to initially rotate said plurality of turbine(s) of said Brayton closed-system nuclear cycle during start-up of said energy generation system and wherein electrical power can be provided to said integrated energy system during normal and abnormal operation of said integrated energy system and wherein rotation of said turbines can be provided during emergency operations of said integrated energy system thereby providing for emergency cooling of said reactor of said Brayton closed-system nuclear cycle.

18. The integrated energy system of claim 9 wherein de-superheaters are employed with said Rankine closed-system cycle high temperature, high pressure and said intermediate pressure high temperature fluids directed into said high temperature, high pressure turbine(s) and directed into said intermediate pressure high temperature turbine(s) of the said Rankine closed-system cycle, and thereby avoiding overheating said plurality of Rankine closed-system cycle high pressure turbine(s) and intermediate pressure turbine(s).

19. An integrated energy system comprising:
a nuclear reactor system,
a Brayton open-system air cycle,
a Brayton closed-system supercritical $CO_2$ cycle, and
a Rankine closed-system cycle,
wherein said nuclear system provides heat source energy and wherein said Brayton closed-system supercritical $CO_2$ cycle also provides heat source energy,
wherein said nuclear system is comprised of a working fluid which includes gas or liquid or liquid containing fissile nuclear material, a plurality of reactor(s), a plurality of heat recovery unit(s) comprised of a plurality of heat exchangers and said nuclear system further comprised of a plurality of pumps and/or recirculators,
wherein pressurized working fluid of said nuclear system is directed to a plurality of nuclear reactor core(s) wherein the nuclear fission process transfers energy to said working fluid of said nuclear system,
wherein said nuclear system working fluid is directed to a plurality of nuclear system heat recovery unit(s) comprised of a plurality of heat exchangers,
wherein energy is transferred to said Brayton closed-system supercritical $CO_2$ cycle, and
wherein energy is also transferred to said Rankine closed-system cycle,
wherein said nuclear system working fluid exiting said plurality of heat recovery unit(s) is directed to a plurality of pumps and/or recirculators that direct said nuclear system working fluid to said plurality of nuclear reactor(s),
thereby re-initializing the nuclear system heat generation and energy transfer cycle,
wherein said Brayton closed-system supercritical $CO_2$ cycle comprises a working supercritical $CO_2$, a plurality of pumps/compressors, a plurality of heat exchangers, a plurality of recuperator heat exchangers and plurality of turbines and electrical generators,
wherein a plurality of nuclear system heat recovery unit(s) employ a plurality of heat exchangers that transfer nuclear system working fluid energy to high pressure supercritical $CO_2$ of said Brayton closed-system supercritical $CO_2$ cycle, wherein said plurality of nuclear system heat recovery unit heat exchangers also transfer nuclear system working fluid energy to high and intermediate pressure working fluid of said Rankine closed-system cycle, wherein a plurality of recuperator heat exchangers of said supercritical $CO_2$ Brayton cycle transfer supercritical $CO_2$ Brayton cycle working heat source energy from intermediate pressure supercritical $CO_2$ to said high pressure supercritical $CO_2$ of said Brayton closed-system supercritical $CO_2$ cycle, wherein high pressure, high temperature supercritical $CO_2$ enters a plurality of high pressure supercritical $CO_2$ turbines that rotate a plurality of electrical generators, wherein intermediate pressure high temperature supercritical $CO_2$ of said supercritical $CO_2$ Brayton cycle discharged from said plurality of supercritical $CO_2$ turbine(s) is directed to a plurality of Rankine closed-system cycle heat exchangers and a plurality of closed-system supercritical $CO_2$ cycle recuperator heat exchangers, wherein intermediate pressure supercritical $CO_2$ heat source energy is transferred to high pressure supercritical $CO_2$ of said Brayton supercritical $CO_2$ cycle, wherein intermediate pressure supercritical $CO_2$ heat source energy is also transferred to high pressure and intermediate pressure working fluids of said Rankine closed-system cycle, wherein intermediate pressure, reduced temperature supercritical $CO_2$ is cooled by a plurality of heat exchanger(s) that transfer energy to the ultimate heat sink, wherein the intermediate pressure cooled $CO_2$ of said supercritical $CO_2$ Brayton cycle is repressurized to a high pressure supercritical state by a plurality of pumps/compressors, thereby re-initializing said Brayton closed-system supercritical $CO_2$ cycle, wherein said Rankine closed-system cycle comprises a working fluid, a plurality of pumps, a plurality of heat exchangers, a plurality of turbines and a plurality of electrical generators, wherein said nuclear system heat source energy is transferred to said working fluids of said Rankine closed-system cycle from a plurality said nuclear system's heat recovery unit(s), wherein intermediate pressure closed-system supercritical $CO_2$ cycle heat source energy is transferred to said working fluids of said Rankine closed-system cycle from a plurality of closed-system intermediate pressure supercritical $CO_2$ cycle heat exchangers, wherein Rankine closed-system cycle high temperature, high pressure fluids are directed to a plurality of high pressure Rankine closed-system cycle turbines rotating a plurality of generators, wherein intermediate pressure intermediate temperature Rankine fluids discharged from said plurality of high pressure Rankine closed-system cycle turbines are reheated by intermediate pressure heat source energy from a plurality of supercritical $CO_2$ Brayton cycle heat exchangers, wherein intermediate pressure intermediate temperature Rankine fluids are further reheated by a plurality of nuclear system heat recovery unit Rankine closed-system cycle heat exchanger(s), wherein said Rankine closed-system cycle reheated, high temperature, intermediate pressure working fluids are directed to a plurality of intermediate pressure Rankine closed-system cycle turbine(s) rotating a plurality of generators, wherein low-pressure low temperature Rankine closed-system cycle working fluids discharged from said plurality of intermediate pressure Rankine closed-system cycle turbines are directed to a plurality of cooling heat exchanger(s) that condense the Rankine closed-system cycle working fluid and transfer energy to the ultimate heat sink, wherein the condensed low pressure Rankine closed-system cycle fluids are directed to a plurality of Rankine closed-system cycle pumps that re-pressurization said Rankine closed-system cycle fluids to high pressures, and thereby re-initializing said Rankine closed-system cycle.

20. The integrated energy system of claim 19 wherein high pressure, low to intermediate temperature supercritical $CO_2$ cools portions of the plurality of high pressure supercritical $CO_2$ turbines exposed to high temperature high pressure supercritical $CO_2$, and thereby utilizing very hot high pressure supercritical $CO_2$ to reduce overheating of the plurality of high pressure high temperature supercritical $CO_2$ turbine(s).

21. The integrated energy system of claim 19 wherein additional energy is added to said high pressure high temperature supercritical $CO_2$ prior to said supercritical $CO_2$ being directed to a plurality of said high pressure high temperature supercritical $CO_2$ turbine, wherein said additional energy is transferred from a circulating fluid heated by burners employing a combustible fuel such as natural gas, gasified coal and/or liquid fuels, and/or wherein said additional energy can include hydrogen created by electrolysis of water and said hydrogen stored to support grid peaking applications and wherein said electrolysis energy can be provided from renewable energy sources, and thereby providing additional peaking energy.

22. The integrated energy system of claim 19 wherein clutches are provided to disengage the plurality of generator(s) rotated by said plurality of Rankine closed-system cycle turbine(s) and said plurality of Brayton closed-system supercritical $CO_2$ cycle turbine(s), thereby enabling said electrical generator(s) to act as synchronous condenser(s) during periods when said claim 19 energy generation system turbines are not operational, and thereby supporting electrical grids subjected to intermittent renewable energy generating resources.

23. The integrated energy system of claim 19 wherein additional energy is added to said high pressure high temperature supercritical $CO_2$ of said Brayton supercritical $CO_2$ cycle prior to said high pressure high temperature supercritical $CO_2$ is directed to the high pressure high temperature supercritical $CO_2$ turbine, wherein said additional energy is transferred to said high pressure high temperature supercritical $CO_2$ from a circulating fluid heated using a plurality of burners employing a combustible fuel such as natural gas, gasified, and/or liquid fossil fuel, wherein said circulating fluid includes pumps and a circulating fluid energy storage tank, and/or wherein said burner fuel energy heating said circulating heating fluid can include hydrogen created by electrolysis of water and said hydrogen stored to support grid peaking applications and wherein said electrolysis energy can be provided from renewable energy sources such as solar panels or wind, and thereby providing additional peaking energy.

24. The integrated energy system of claim 19 wherein a plurality of refrigeration system(s) provide low temperature fluids to heat exchanger used to cool the intermediate pressure working fluid supercritical $CO_2$ of the closed system supercritical $CO_2$ Brayton cycle to the fluid state prior to aid $CO_2$ working fluid entering the pump/compressors of said Brayton closed-system supercritical $CO_2$ cycle, and thereby providing additional energy to the electrical grid during periods of high ambient temperatures.

25. The integrated energy system of claim 19 wherein the plurality of electrical generator(s) rotated by said turbine(s) of said Brayton closed-system supercritical $CO_2$ cycle and rotated by said turbine(s) of said Rankine closed-system cycle is used to initially rotate said turbines during start-up of said energy generation system.

26. The integrated energy system of claim 19 wherein de-superheaters are employed with said Rankine closed-system cycle high temperature, high pressure and said intermediate pressure high temperature fluids directed into said high temperature, high pressure turbine(s) and directed into said intermediate pressure high temperature turbine(s) of the said Rankine closed-system cycle, and thereby reducing overheating of said plurality of Rankine closed-system cycle high pressure turbine(s) and intermediate pressure turbine(s).

27. An integrated energy system comprising:
a solar energy system,
a Brayton open-system air cycle,
a Brayton closed-system supercritical $CO_2$ cycle, and
a Rankine closed-system cycle,
wherein said solar system provides heat source energy and wherein said Brayton closed-system supercritical $CO_2$ cycle also provides heat source energy,
wherein said solar system is comprised of a working fluid, a plurality of solar energy receiver comprised of a plurality of heat exchanger(s), a plurality of working fluid storage tank(s), a plurality of heat recovery unit(s) comprised of a plurality of heat exchangers and further comprised of a plurality of pumps and/or recirculators,
wherein a plurality of solar mirrors reflect sunlight onto said plurality of solar receiver(s),
wherein solar energy is transferred to a plurality of solar receiver heat exchanger(s) that transfer high temperature energy to said working fluid of said solar system,
wherein said high temperature solar system working fluid is directed to a plurality of high temperature storage tank(s),
wherein said high temperature solar system working fluid is directed to a plurality of heat recovery unit(s) comprised of a plurality of heat exchangers that transfer energy to said Brayton closed-system supercritical $CO_2$ cycle and also transfer energy to said Rankine closed-system cycle,
wherein said working fluid exiting said solar system heat recovery unit(s) is directed to a plurality of reduced temperature solar system working fluid storage tank(s),
wherein reduced temperature solar system working fluid is directed to plurality of pumps and/or recirculators that direct said solar system working fluid to said plurality of solar system receivers, thereby re-initializing said solar system heat generation and energy transfer cycle, wherein said Brayton closed-system supercritical $CO_2$ cycle comprises a working supercritical $CO_2$, a plurality of pumps/compressors, a plurality of heat exchangers, a plurality of recuperator heat exchangers and plurality of turbines and electrical generators, wherein a plurality of solar system heat recovery unit(s) employ a plurality of heat exchangers that transfer solar system working fluid energy to high pressure supercritical $CO_2$ of said Brayton closed-system supercritical $CO_2$ cycle, wherein said plurality of solar system heat recovery unit heat exchangers also transfer solar system working fluid energy to high and intermediate pressure working fluid of said Rankine closed-system cycle, wherein a plurality of recuperator heat exchangers of said supercritical $CO_2$ Brayton cycle transfer supercritical $CO_2$ Brayton cycle working heat source energy from intermediate pressure supercritical $CO_2$ to said high pressure supercritical $CO_2$ of said Brayton closed-system supercritical $CO_2$ cycle, wherein high pressure, high temperature supercritical $CO_2$ enters a plurality of high pressure supercritical $CO_2$ turbines that rotate a plurality of electrical generators, wherein intermediate pressure, high temperature supercritical $CO_2$ of said supercritical $CO_2$ Brayton cycle discharged from said plurality of supercritical $CO_2$ turbine(s) is directed to a plurality of Rankine closed-system cycle heat exchangers and a plurality of closed-system supercritical $CO_2$ cycle recuperator heat exchangers, wherein intermediate pressure supercritical $CO_2$ heat source energy is transferred to high pressure supercritical $CO_2$ of said Brayton supercritical $CO_2$ cycle, wherein intermediate pressure supercritical $CO_2$ heat source energy is also transferred to high pressure and intermediate pressure working fluids of said Rankine closed-system cycle, wherein intermediate pressure, reduced temperature supercritical $CO_2$ is cooled by a plurality of heat exchanger(s) that transfer energy to the ultimate heat sink, wherein the intermediate pressure-cooled $CO_2$ of said supercritical $CO_2$ Brayton cycle is repressurized to a high pressure supercritical state by a plurality of pumps/compressors, thereby re-initializing said Brayton closed-system supercritical $CO_2$ cycle, wherein said Rankine closed-system cycle comprises a working fluid, a plurality of pumps, a plurality of heat exchangers, a plurality of turbines and a plurality of electrical generators, wherein said solar system heat source energy is transferred to said working fluids of said Rankine closed-system cycle from a plurality said nuclear system's heat recovery unit(s), wherein intermediate pressure closed-system supercritical $CO_2$ cycle heat source energy is transferred to said working fluids of said Rankine closed-system cycle from a plurality of closed-system intermediate pressure supercritical $CO_2$ cycle heat exchangers, wherein Rankine closed-system cycle high temperature, high pressure fluids are directed to a plurality of high pressure Rankine closed-system cycle turbines rotating a plurality of generators, wherein intermediate pressure intermediate temperature Rankine fluids discharged from said plurality of high pressure Rankine closed-system cycle turbines are reheated by intermediate pressure heat source energy from a plurality of supercritical $CO_2$ Brayton cycle heat exchangers, wherein intermediate pressure intermediate temperature Rankine fluids are further reheated by a plurality of solar system heat recovery unit Rankine closed-system cycle heat exchanger(s), wherein said Rankine closed-system cycle reheated, high temperature, intermediate pressure working fluids are directed to a plurality of intermediate pressure Rankine closed-system cycle turbine(s) rotating a plurality of generators, wherein low-pressure low temperature Rankine closed-system cycle working fluids discharged from said plurality of intermediate pressure Rankine closed-system cycle turbines are directed to a plurality of cooling heat exchanger(s) that condense the Rankine closed-system cycle working fluid and transfer energy to the ultimate heat sink, wherein the condensed low-pressure Rankine closed-system cycle fluids are directed to a plurality of Rankine closed-system cycle pumps that re-pressurization said Rankine closed-system cycle fluids to high pressures, and thereby re-initializing said Rankine closed-system cycle.

28. The integrated energy system of claim 27 wherein high pressure, low to intermediate temperature supercritical $CO_2$ cools portions of the plurality of high pressure supercritical $CO_2$ turbine(s) exposed to high temperature high pressure supercritical $CO_2$, and thereby utilizing very hot high pressure supercritical $CO_2$ to reduce overheating of the plurality of high pressure high temperature supercritical $CO_2$ turbine(s).

29. The integrated energy system of claim 27 wherein additional energy is added to said high temperature solar system working fluid prior to said fluid being directed to the plurality of said solar system heat recovery units from the plurality of said solar system high temperature storage tank(s), wherein high temperature solar system working fluid is recirculated from said high temperature storage tank(s) to a plurality of heat exchanger(s) into which energy is transferred using a plurality of burners employing a combustible fuel such as natural gas, gasified, and/or liquid fossil fuel, and/or wherein said additional fuel energy can include hydrogen gas created by electrolysis of water and said hydrogen stored to support grid peaking applications and wherein said electrolysis energy can be provided from renewable energy sources such as solar panels or wind, and thereby providing additional peaking energy.

30. The integrated energy system of claim 27 wherein clutches are provided to disengage the plurality of generator(s) rotated by said plurality of Rankine closed-system cycle turbine(s) and said plurality of Brayton closed-system supercritical $CO_2$ cycle turbine(s), thereby enabling said electrical generator(s) to act as synchronous condenser(s) during periods when said claim 27 energy generation system turbines are not operational, and thereby supporting electrical grids subjected to intermittent renewable energy generating resources that can adversely impact the stability of the grid.

31. The integrated energy system of claim 27 wherein a plurality of refrigeration system(s) provide low temperature fluids to heat exchanger used to cool the intermediate pressure working fluid supercritical $CO_2$ of the closed system supercritical $CO_2$ Brayton cycle to the fluid state prior to aid $CO_2$ working fluid entering the pump/compressors of said Brayton closed-system supercritical $CO_2$ cycle, and thereby providing additional energy to the electrical grid during periods of high ambient temperatures.

32. The integrated energy system of claim 27 wherein the plurality of electrical generator(s) rotated by said turbine(s) of said Brayton closed-system supercritical $CO_2$ cycle and rotated by said turbine(s) of said Rankine closed-system cycle is used to initially rotate said turbines during start-up of said energy generation system.

33. The integrated energy system of claim 27 wherein de-superheaters are employed with said Rankine closed-system cycle high temperature, high pressure and said intermediate pressure high temperature fluids directed into said high temperature, high pressure turbine(s) and directed into said intermediate pressure high temperature turbine(s) of the said Rankine closed-system cycle, and thereby reducing overheating of said Rankine closed-system cycle high pressure turbine(s) and intermediate pressure turbine(s).

* * * * *